(12) United States Patent
Kobayashi et al.

(10) Patent No.: US 12,106,900 B2
(45) Date of Patent: Oct. 1, 2024

(54) SOLENOID, SOLENOID VALVE, AND SHOCK ABSORBER

(71) Applicant: KYB CORPORATION, Tokyo (JP)

(72) Inventors: Yoshifumi Kobayashi, Tokyo (JP); Tomoyasu Abe, Tokyo (JP); Yuusuke Furuta, Tokyo (JP); Naoaki Danshita, Kyoto (JP); Kohei Doi, Kyoto (JP); Masatoshi Iyatani, Kyoto (JP)

(73) Assignee: KYB Corporation, Tokyo (JP)

( * ) Notice: Subject to any disclaimer, the term of this patent is extended or adjusted under 35 U.S.C. 154(b) by 352 days.

(21) Appl. No.: 17/626,992

(22) PCT Filed: Sep. 2, 2020

(86) PCT No.: PCT/JP2020/033320
§ 371 (c)(1),
(2) Date: Jan. 13, 2022

(87) PCT Pub. No.: WO2021/049396
PCT Pub. Date: Mar. 18, 2021

(65) Prior Publication Data
US 2022/0254555 A1 Aug. 11, 2022

(30) Foreign Application Priority Data
Sep. 9, 2019 (JP) ................... 2019-163880

(51) Int. Cl.
*F16F 9/34* (2006.01)
*F16K 31/06* (2006.01)
(Continued)

(52) U.S. Cl.
CPC ............... *H01F 7/081* (2013.01); *F16F 9/34* (2013.01); *F16K 31/0675* (2013.01); *H01F 7/16* (2013.01); *F16F 9/10* (2013.01); *F16F 2222/12* (2013.01)

(58) Field of Classification Search
CPC .... H01F 7/081; H01F 7/16; F16F 9/10; F16F 9/34; F16F 2222/12; F16K 31/0675
(Continued)

(56) References Cited

U.S. PATENT DOCUMENTS

| 3,463,443 A | 8/1969 | Churchill |
| 11,721,464 B2 * | 8/2023 | Kamakura ................ F16F 9/19 188/266.2 |

(Continued)

FOREIGN PATENT DOCUMENTS

| JP | S52-070328 U | 5/1977 |
| JP | 2005-291244 A | 10/2005 |

(Continued)

OTHER PUBLICATIONS

May 16, 2023, Japanese Office Action issued for related JP Application No. 2019-163880.

(Continued)

*Primary Examiner* — Christopher P Schwartz
(74) *Attorney, Agent, or Firm* — Paratus Law Group, PLLC

(57) ABSTRACT

A solenoid includes a first fixed iron core and a second fixed iron core located on one axial end side and the other axial end side of a coil, a first movable member and a second movable member located between those fixed iron cores and configured to be attracted to the first fixed iron core and the second fixed iron core, respectively, by energization of the coil, a spring configured to bias the first movable member toward the second fixed iron core, and a first regulating portion made from a non-magnetic material, provided integrally with the first movable member or the second movable member, and configured to regulate movement of the first movable member toward the second fixed iron core with respect to the second movable member.

12 Claims, 8 Drawing Sheets

(51) Int. Cl.
*H01F 7/08* (2006.01)
*H01F 7/16* (2006.01)
*F16F 9/10* (2006.01)

(58) Field of Classification Search
USPC ...... 188/266.1, 266.2, 299.1, 322.15, 322.22
See application file for complete search history.

(56) References Cited

U.S. PATENT DOCUMENTS

| | | | |
|---|---|---|---|
| 2007/0051839 A1* | 3/2007 | Tsujimura | B60T 8/363 |
| | | | 242/261 |
| 2010/0213758 A1 | 8/2010 | Nanahara | |
| 2010/0308244 A1 | 12/2010 | Oikawa et al. | |
| 2013/0020514 A1 | 1/2013 | Watanabe et al. | |
| 2016/0025237 A1 | 1/2016 | Mori et al. | |
| 2018/0094741 A1 | 4/2018 | Paulus | |
| 2021/0012939 A1* | 1/2021 | Kamakura | F16F 9/19 |
| 2022/0243839 A1* | 8/2022 | Kobayashi | F16K 31/0675 |
| 2022/0252127 A1* | 8/2022 | Kobayashi | F16F 9/469 |
| 2022/0252128 A1* | 8/2022 | Kobayashi | H01F 7/081 |

FOREIGN PATENT DOCUMENTS

| | | |
|---|---|---|
| JP | 2009-275735 A | 11/2009 |
| JP | 2011-009381 A | 1/2011 |
| JP | 2011-256951 A | 12/2011 |
| JP | 2014-173716 A | 9/2014 |
| JP | 2019-160994 A | 9/2019 |

OTHER PUBLICATIONS

Feb. 14, 2023, Japanese Office Action issued for related JP Application No. 2019-163880.

* cited by examiner (a)

(b)

SOLENOID, SOLENOID VALVE, AND SHOCK ABSORBER

CROSS REFERENCE TO PRIOR APPLICATION

This application is a National Stage Patent Application of PCT International Patent Application No. PCT/JP2020/033320 (filed on Sep. 2, 2020) under 35 U.S.C. § 371, which claims priority to Japanese Patent Application No. 2019-163880 (filed on Sep. 9, 2019), which are all hereby incorporated by reference in their entirety.

TECHNICAL FIELD

The present invention relates to a solenoid, a solenoid valve including the solenoid, and a shock absorber provided with the solenoid valve including the solenoid.

BACKGROUND ART

Conventionally, there is a solenoid including a coil and a movable member that is attracted to one axial side of the coil when a magnetic field is generated by energization of the coil and a magnetic flux flows. The solenoid can apply force to attract the movable member to another member (object) as a thrust and can change the thrust in accordance with an energization amount. Such a solenoid is used in, for example, solenoid valves.

Among those solenoid valves, there is a solenoid valve that is provided partway in a pressure control passage, includes the solenoid, a valve body that opens and closes the pressure control passage, and a spring that biases the valve body in an opening direction, and applies a thrust to the valve body in a closing direction by using the solenoid. According to this solenoid valve, a valve opening pressure of the solenoid valve increases as an amount of current supplied to the solenoid is increased, thereby increasing a pressure on an upstream side from the solenoid valve. Such a solenoid valve is used in, for example, shock absorbers.

Among those shock absorbers, there is a shock absorber including the solenoid valve, a main passage through which liquid flows when the shock absorber extends and contracts, and a main valve body that opens and closes the main passage. In the shock absorber, the pressure control passage provided with the solenoid valve is connected to a back pressure chamber formed on a back surface of the main valve body. According to this shock absorber, a back pressure of the main valve body (a pressure in the back pressure chamber) increases as the amount of current supplied to the solenoid is increased to increase the valve opening pressure of the solenoid valve, thereby increasing damping force to be generated (e.g., Patent Literature 1).

CITATION LIST

Patent Literature

Patent Literature 1: JP 2014-173716 A

SUMMARY OF INVENTION

Technical Problem

Herein, in a case where a shock absorber is used for a suspension or the like of a vehicle, in order to improve ride quality during normal traveling in which the vehicle travels on a smooth road, it is preferable to reduce damping force generated during the normal traveling. The conventional shock absorber provided with the solenoid valve including the solenoid can reduce the damping force generated when the amount of current supplied to the solenoid is reduced and can therefore reduce power consumption, i.e., save power during the normal traveling. However, if the solenoid valve is fully opened to minimize the back pressure of the main valve body in the conventional shock absorber during a failure in which the solenoid is not energized, the damping force during the failure becomes insufficient.

Therefore, the valve body of the solenoid valve provided in the shock absorber disclosed in JP 2014-173716 A includes two opening/closing portions that open and close the pressure control passage. One opening/closing portion functions as an opening/closing portion while a pressure is being under control, the opening/closing portion being biased in the opening direction by the spring and receiving a thrust applied in the closing direction by the solenoid. Meanwhile, in a state in which the solenoid is not energized and the one opening/closing portion is fully opened by biasing force of the spring, the other opening/closing portion closes a part on a downstream side of the pressure control passage from a part opened and closed by the one opening/closing portion.

The shock absorber further includes a failure passage connected between the part opened and closed by the one opening/closing portion and the part opened and closed by the other opening/closing portion in the pressure control passage and provided with a passive valve partway therein. With this, when the solenoid is not energized and the pressure control passage is closed by the other opening/closing portion of the solenoid valve, liquid in the back pressure chamber passes through the failure passage, and therefore the back pressure of the main valve body is set to a valve opening pressure of the passive valve. Therefore, even in the conventional shock absorber, the damping force of the shock absorber is not insufficient during a failure.

However, in a case where the shock absorber described above includes two passages, i.e., the pressure control passage and the failure passage as a passage connected to the back pressure chamber to set the back pressure of the main valve body and switches a passage to be connected to the back pressure chamber between when the solenoid is energized and when the solenoid is not energized, a structure of the shock absorber becomes complicated to increase costs. However, in a case where the valve body of the solenoid valve is biased in the closing direction by the spring and a thrust is applied to the valve body in the opening direction by the solenoid, it is unnecessary to switch the passage to be connected to the back pressure chamber between when the solenoid is energized and when the solenoid is not energized, but it is necessary to increase the amount of current supplied to the solenoid in order to reduce the damping force to be generated. This increases power consumption during normal traveling.

That is, for example, in order to use the solenoid for the solenoid valve that can vary the damping force of the shock absorber, it is desired in some cases to reduce the thrust applied to an object such as the valve body when the amount of current supplied to the solenoid is small and to bias the object in the same direction as that of the thrust even when the solenoid is not energized. However, this cannot be achieved by the conventional solenoid. Therefore, in a case where the conventional solenoid is used for the solenoid valve that can vary the damping force of the shock absorber, the following problems arise: the structure of the shock absorber becomes complicated; and power consumption during normal traveling of the vehicle increases.

The present invention has been made in order to solve such problems, and an object thereof is to provide a solenoid, a solenoid valve, and a shock absorber, each of which can reduce a thrust of the solenoid applied to an object in a case where an amount of current supplied to the solenoid is small and, even when the solenoid is not energized, can bias the object in the same direction as that of the thrust when the solenoid is energized.

Solution to Problem

A solenoid for solving the above problems includes a first fixed iron core and a second fixed iron core located on one axial end side and the other axial end side of a coil, a first movable member and a second movable member located between those fixed iron cores and configured to be attracted to the first fixed iron core and the second fixed iron core, respectively, by energization of the coil, a spring configured to bias the first movable member toward the second fixed iron core, and a first regulating portion made from a non-magnetic material, provided integrally with the first movable member or the second movable member, and configured to regulate movement of the first movable member toward the second fixed iron core with respect to the second movable member.

According to the above configuration, when the solenoid is not energized, the first movable member receives biasing force of the spring and moves toward the second fixed iron core, and, when the first regulating portion regulates the movement of the first movable member toward the second fixed iron core with respect to the second movable member, the biasing force of the spring is transmitted from the first movable member to the second movable member. Meanwhile, when the solenoid is energized, the first movable member is attracted to the first fixed iron core and moves in the attraction direction, the spring is compressed by the first movable member, and therefore the biasing force of the spring is not transmitted to the second movable member. Furthermore, when the solenoid is energized, the second movable member is attracted to the second fixed iron core, and force to attract the second movable member to the second fixed iron core increases as the amount of current supplied to the solenoid is increased.

Therefore, when the solenoid is energized and the force to attract the second movable member is applied to an object as a thrust, the thrust applied to the object increases as the amount of current supplied to the solenoid is increased, whereas the thrust applied to the object decreases as the amount of current supplied to the solenoid is decreased. When the solenoid is not energized, the biasing force of the spring acts on the object via the first movable member and the second movable member. A direction of the biasing force of the spring is the same as the direction of the force to attract the second movable member when the solenoid is energized. Therefore, according to the above configuration, even when the solenoid is not energized, the object can be biased in the same direction as that when the solenoid is energized.

According to the above configuration, because the first regulating portion is made from a non-magnetic material, it is possible to prevent the first movable member and the second movable member from being adsorbed to each other when the coil is energized. Furthermore, the first regulating portion is provided integrally with the first movable member or the second movable member, and therefore, for example, when a PWM control current is applied to the solenoid, the first movable member and the second movable member vibrate to excite and vibrate the first regulating portion, thereby preventing an increase in high frequency sound.

The solenoid may include a second regulating portion made from a non-magnetic material, provided integrally with the second movable member or the second fixed iron core, and configured to regulate movement of the second movable member toward the second fixed iron core. With this, because the second regulating portion is made from a non-magnetic material, it is possible to prevent the second movable member from being adsorbed to the second fixed iron core when the coil is energized. Furthermore, the second regulating portion is provided integrally with the second movable member or the second fixed iron core, and therefore, for example, when the PWM control current is applied to the solenoid, the second movable member vibrates to excite and vibrate the second regulating portion, thereby preventing an increase in high frequency sound.

Furthermore, the solenoid may further include an annular filler ring interposed between the first fixed iron core and the second fixed iron core, and the second movable member may have a bottomed tubular shape, have an outer bottom portion and an outer tube portion, and be inserted into the filler ring so as to be axially movable while the outer bottom portion is facing the second fixed iron core, the first movable member may have a bottomed tubular shape and have an inner bottom portion and an inner tube portion, the inner tube portion being inserted into the outer tube portion so as to be axially movable while the inner bottom portion is facing the second fixed iron core, and the spring may be interposed between the inner bottom portion and the first fixed iron core so that one end side of the spring is inserted into the inner tube portion.

According to the above configuration, in a case where the inner tube portion of the first movable member and the outer tube portion of the second movable member are made from a magnetic material, a magnetic path passes through the first fixed iron core, the first movable member, the second movable member, and the second fixed iron core when the coil is excited, thereby attracting the first movable member to the first fixed iron core and attracting the second movable member to the second fixed iron core. Furthermore, it is possible to reduce the solenoid in size while securing a space for storing the spring inside the first movable member.

According to the above configuration, when the first movable member moves toward the second fixed iron core, the inner bottom portion of the first movable member approaches the outer bottom portion of the second movable member. When the second movable member moves toward the second fixed iron core, the outer bottom portion of the second movable member approaches the second fixed iron core. Therefore, in a case where the first and second regulating portions are disposed to regulate the movement of the movable members in the approaching direction, each regulating portion can regulate the movement of the first movable member toward the second fixed iron core with respect to the second movable member or can regulate the movement of the second movable member toward the second fixed iron core, and the first and second regulating portions can be easily disposed.

The solenoid may further include an annular filler ring interposed between the first fixed iron core and the second fixed iron core, and the first movable member may have an inner tube portion and outer tube portion disposed on inner and outer sides in a double manner, a connecting portion connecting one axial ends of those tube portions, and an inner bottom portion located at the other end of the inner tube portion and be slidably inserted into the filler ring while the inner bottom portion is facing the second fixed iron core, the second movable member may have a bottomed tubular shape and have an outer bottom portion and an intermediate tube portion having an inner diameter larger than an outer diameter of the inner tube portion, the intermediate tube portion being slidably inserted into the outer tube portion while the outer bottom portion is facing the second fixed iron core, and the spring may be interposed between the inner bottom portion and the first fixed iron core so that one end side of the spring is inserted into the inner tube portion.

According to the above configuration, in a case where the outer tube portion of the first movable member and the intermediate tube portion of the second movable member are made from a magnetic material, a magnetic path passes through the first fixed iron core, the first movable member, the second movable member, and the second fixed iron core when the coil is excited, thereby attracting the first movable member to the first fixed iron core and attracting the second movable member to the second fixed iron core. Furthermore, a space for storing the spring can be secured inside the first movable member.

According to the above configuration, when the first movable member moves toward the second fixed iron core, the inner bottom portion of the first movable member approaches the outer bottom portion of the second movable member. When the second movable member moves toward the second fixed iron core, the outer bottom portion of the second movable member approaches the second fixed iron core. Therefore, in a case where the first and second regulating portions are disposed to regulate the movement of the movable members in the approaching direction, each regulating portion can regulate the movement of the first movable member toward the second fixed iron core with respect to the second movable member or can regulate the movement of the second movable member toward the second fixed iron core, and the first and second regulating portions can be easily disposed.

The solenoid may further include a regulating member attached to the outer bottom portion, and the regulating member may have an insertion shaft and a seat portion, the insertion shaft being press-fitted into a through hole formed in the outer bottom portion while one end of the insertion shaft is protruding from the outer bottom portion toward the second fixed iron core, the seat portion being located between the outer bottom portion and the inner bottom portion so as to protrude from the other end of the insertion shaft toward an outer peripheral side, the seat portion may function as the first regulating portion, and one end portion of the insertion shaft protruding from the outer bottom portion toward the second fixed iron core may function as the second regulating portion. With this configuration, it is easy to provide both the first and second regulating portions integrally with the second movable member.

The solenoid may further include a regulating member attached to the outer bottom portion, and the regulating member may have an insertion shaft and a seat portion, the insertion shaft being press-fitted into a through hole formed in the outer bottom portion while one end of the insertion shaft is protruding from the outer bottom portion toward the first fixed iron core, the seat portion being located between the outer bottom portion and the second fixed iron core so as to protrude from the other end of the insertion shaft toward an outer peripheral side, one end portion of the insertion shaft protruding from the outer bottom portion toward the first fixed iron core may function as the first regulating portion, and the seat portion may function as the second regulating portion. Also in such a case, it is easy to provide both the first and second regulating portions integrally with the second movable member.

In the solenoid including the second movable member having the outer tube portion, the first regulating portion may be an annular member and be press-fitted into an inner periphery of the outer tube portion. In such a case, it is easy to provide the first regulating portion integrally with the second movable member and separately from the second regulating portion. Furthermore, a part of the first movable member, such as the inner bottom portion of the first movable member or a portion including the inner bottom portion and the inner tube portion, may be made from a non-magnetic material and function as the first regulating portion. Also in such a case, it is easy to provide the first regulating portion integrally with the first movable member.

The second fixed iron core of the solenoid may have an annular protruding portion into which a second-fixed-iron-core-side end portion of the second movable member is inserted, and the second regulating portion may be an annular member and be press-fitted into an inner periphery of the annular protruding portion. In such a case, it is easy to provide the second regulating portion integrally with the second fixed iron core. Furthermore, the second regulating portion may have a seat portion and a fitting portion, the seat portion being located between the outer bottom portion of the second movable member and the second fixed iron core, the fitting portion being press-fitted into a through hole formed in the outer bottom portion so as to protrude from the seat portion. In such a case, it is easy to provide the second regulating portion integrally with the second movable member and separately from the first regulating portion.

A solenoid valve including the solenoid and provided partway in a pressure control passage may include the solenoid, a valve body configured to open and close the pressure control passage, and the solenoid may apply force to attract the second movable member toward the second fixed iron core, the force being generated when the coil is energized, to the valve body in a direction to close the pressure control passage. With this, a valve opening pressure of the solenoid valve can be adjusted by changing the amount of current supplied to the solenoid, and a pressure on an upstream side from the solenoid valve can be set to the valve opening pressure of the solenoid valve.

Furthermore, as described above, in the solenoid, the thrust applied to the object can be increased as the amount of current supplied thereto increases. Therefore, in the solenoid valve, the thrust applied to the valve body in the closing direction by the solenoid is increased as the amount of current supplied to the solenoid is increased, thereby increasing the valve opening pressure of the solenoid valve. Furthermore, as described above, in the solenoid, even when the solenoid is not energized, the object can be biased by the spring in the same direction as that of the thrust when the solenoid is energized. Therefore, the valve opening pressure of the solenoid valve when the solenoid is not energized is determined according to a specification of the spring.

A shock absorber provided with a solenoid valve including the solenoid may include a cylinder, a rod inserted into the cylinder so as to be axially movable, a main passage through which liquid flows when the cylinder and the rod axially and relatively move, a main valve body configured to open and close the main passage, a pressure introduction passage provided with an orifice partway in the pressure introduction passage and configured to reduce a pressure on an upstream side from the main valve body of the main passage and guide the pressure to a back surface of the main valve body, and a pressure control passage provided with the solenoid valve and connected to the pressure introduction passage on a downstream side from the orifice.

With this, in a case where the main valve body applies resistance to a flow of the liquid passing through the main passage when the cylinder and the rod axially and relatively move, the shock absorber can generate damping force caused by the resistance. Furthermore, the back pressure of the main valve body is set to the valve opening pressure of the solenoid valve, and therefore the back pressure of the main valve body can be adjusted by changing the amount of current supplied to the solenoid. Furthermore, the main valve body is less likely to open as the back pressure of the main valve body is increased, thereby increasing the damping force to be generated. Therefore, according to the above configuration, a magnitude of the damping force to be generated can be adjusted by changing the amount of current supplied to the solenoid.

Furthermore, as described above, in the solenoid valve, the valve opening pressure of the solenoid valve can be increased as the amount of current supplied to the solenoid is increased. Therefore, in the shock absorber, the back pressure of the main valve body can be increased as the amount of current supplied to the solenoid is increased, thereby increasing the damping force to be generated. That is, in a case where the amount of current supplied to the solenoid is small, the shock absorber can reduce the damping force to be generated. Therefore, in a case where the shock absorber is used for a suspension of a vehicle, it is possible to reduce power consumption during normal traveling. This restrains heat generation of the solenoid and reduces a change in temperature of the shock absorber. Therefore, it is possible to reduce a change in damping force characteristic (a characteristic of damping force with respect to a piston speed) caused by a change in temperature of the liquid.

As described above, the valve opening pressure of the solenoid valve when the solenoid is not energized can be determined according to the specification of the spring, and therefore, in the shock absorber, the back pressure of the main valve body can be increased even when the solenoid is not energized. With this, the shock absorber can prevent insufficiency of the damping force during a failure. Furthermore, the shock absorber is only required to provide the pressure control passage as a passage to set the back pressure of the main valve body and is not required to switch the passage to set the back pressure between when the solenoid is energized and when the solenoid is not energized. This makes it possible to restrain the structure of the shock absorber from being complicated and to reduce costs.

Advantageous Effects of Invention

According to a solenoid, a solenoid valve, and a shock absorber of the present invention, it is possible to reduce a thrust of the solenoid applied to an object in a case where an amount of current supplied to the solenoid is small and, even when the solenoid is not energized, can bias the object in the same direction as that of the thrust when the solenoid is energized.

DESCRIPTION OF EMBODIMENTS

Embodiments of the present invention will be described below with reference to the drawings. The same reference signs denoted in several drawings indicate the same components (portions) or corresponding components (portions).

In each embodiment, a solenoid is used for a solenoid valve, the solenoid valve is used for a shock absorber, and the shock absorber is used for a suspension of a vehicle. However, the purpose of using the solenoid according to the present invention, the solenoid valve including the solenoid, and the shock absorber including the solenoid valve is not limited to the above description and can be appropriately changed.

First Embodiment

Figure 1:
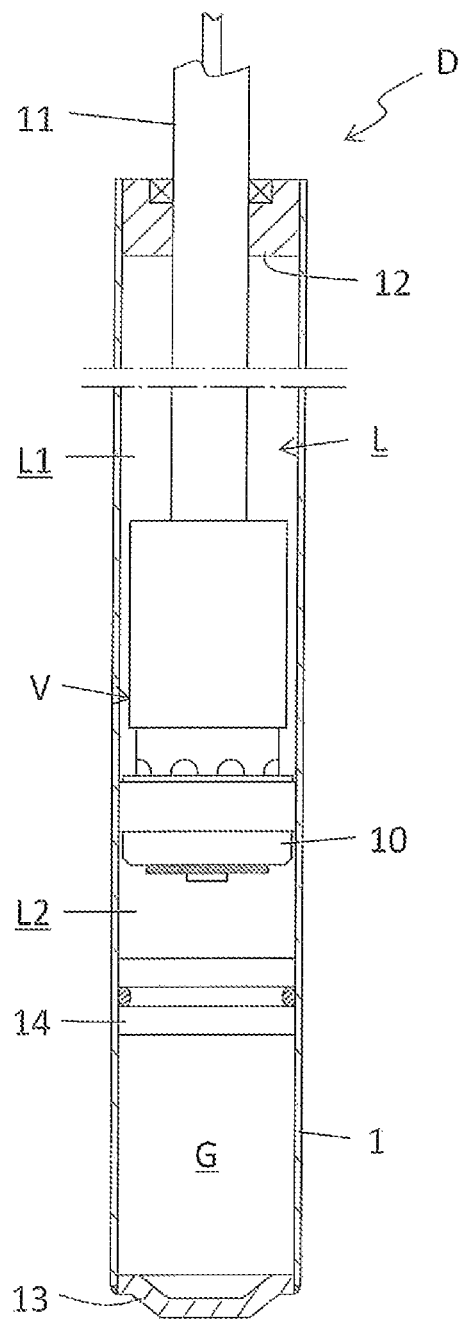
FIG. 1 is a longitudinal sectional view of a shock absorber provided with a solenoid valve including a solenoid according to a first embodiment of the present invention.

As illustrated in FIG. 1, a shock absorber D provided with a solenoid valve V including a solenoid according to a first embodiment of the present invention includes a cylinder 1, a piston 10 slidably inserted into the cylinder 1, and a piston rod 11 having one end connected to the piston 10 and the other end protruding outward from the cylinder 1. The cylinder 1 is connected to one of a vehicle body and axle of a vehicle, and the piston rod 11 is connected to the other. Thus, the shock absorber D is interposed between the vehicle body and the axle.

When, for example, the vehicle travels on a bumpy road surface and wheels vertically vibrate, the piston rod 11 moves in and out of the cylinder 1 to extend and contract the shock absorber D, and the piston 10 moves in the cylinder 1 in a vertical direction (axial direction) in FIG. 1. Although FIG. 1 illustrates a state in which the piston rod 11 protrudes upward from the cylinder 1, the shock absorber D may be attached to the vehicle in any direction.

An annular head member 12 into which the piston rod 11 is allowed to be inserted is attached to one axial end portion of the cylinder 1. The head member 12 slidably supports the piston rod 11 and closes one end of the cylinder 1. Meanwhile, the other end of the cylinder 1 is closed by a bottom cap 13. In this way, the cylinder 1 is hermetically closed, and the cylinder 1 is filled with liquid and gas.

More specifically, a free piston 14 is slidably inserted into the cylinder 1 on a side facing the piston rod 11 as seen from the piston 10. Furthermore, a liquid chamber L filled with liquid such as hydraulic oil is formed on the piston 10 side of the free piston 14 in the cylinder 1. Meanwhile, a gas chamber G filled with compressed gas is formed on a side facing the piston 10 as seen from the free piston 14 in the cylinder 1.

Thus, the liquid chamber L and the gas chamber G in the cylinder 1 are partitioned by the free piston 14. When the shock absorber D extends and contracts and the piston rod 11 moves in and out of the cylinder 1, the free piston 14 moves in the cylinder 1 in the vertical direction (axial direction) in FIG. 1 to enlarge and reduce the gas chamber G, thereby compensating for a volume of the piston rod 11 moving in and out of the cylinder 1.

The liquid chamber L and the gas chamber G may be partitioned by a bladder, bellows, or the like instead of the free piston 14. That is, a configuration of a movable partition wall forming the enlargeable/reducible gas chamber G is not limited to the free piston 14 and can be appropriately changed. Furthermore, a configuration for compensating the volume of the piston rod 11 moving in and out of the cylinder 1 is not limited to the gas chamber G and can be appropriately changed. For example, instead of the gas chamber G, a reservoir that stores liquid and gas may be provided, and the cylinder and the reservoir may exchange the liquid when the shock absorber extends and contracts. Furthermore, a shock absorber D may be provided as a double-rod shock absorber in which piston rods are provided on both sides of the piston. In this case, the configuration for compensating the volume of the piston rod can be omitted.

Figure 2:
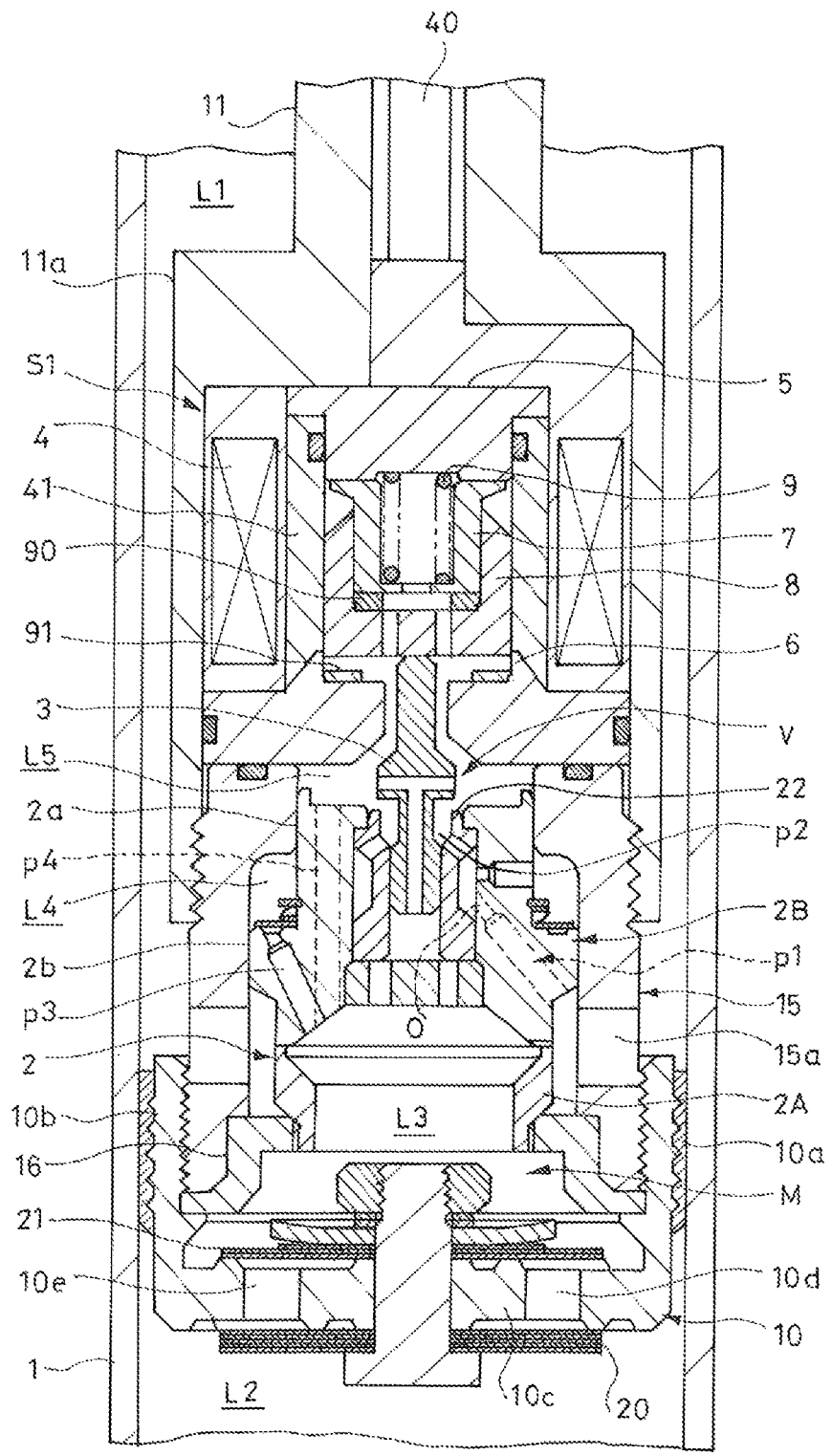
FIG. 2 is an enlarged longitudinal sectional view illustrating the solenoid valve including the solenoid according to the first embodiment of the present invention.

The liquid chamber L in the cylinder 1 is partitioned by the piston 10 into two chambers, i.e., an extension side chamber L1 on the piston rod 11 side and a compression side chamber L2 on the opposite side (opposite to the piston rod). As illustrated in FIG. 2, the piston 10 has a bottomed tubular shape and has a tube portion 10b and a bottom portion 10c. The tube portion 10b has an outer periphery on which a piston ring 10a in sliding contact with an inner periphery of the cylinder 1 is mounted. The bottom portion 10c closes one end of the tube portion 10b. Hereinafter, for convenience of description, a vertical direction in FIG. 2 will be simply referred to as "up" or "down", "upper" or "lower", or "vertically", unless otherwise specified.

The piston 10 is disposed so that the bottom portion 10c faces downward and the tube portion 10b faces upward. The tube portion 10b is connected to a ceiled tubular case portion 11a formed at a distal end portion of the piston rod 11 via a tubular guide 15. An annular valve seat member 16 is fixed between a lower end of the guide 15 and the piston 10. Furthermore, a main valve body 2 separated from and seated on the valve seat member 16 is provided inside the guide 15 so as to be vertically movable.

The main valve body 2 includes a first valve body portion 2A and a second valve body portion 2B that are vertically separable, and an intermediate chamber L3 is formed between the main valve body 2 and the bottom portion 10c of the piston 10. The intermediate chamber L3 is partitioned from the compression side chamber L2 by the piston 10. Furthermore, an extension side port 10d and a compression side port 10e are formed in the bottom portion 10c of the piston 10 to cause the intermediate chamber L3 and the compression side chamber L2 to communicate with each other. Furthermore, an extension side valve 20 that opens and closes an outlet of the extension side port 10d is placed on a lower side of the bottom portion 10c, and a compression side valve 21 that opens and closes an outlet of the compression side port 10e is placed on an upper side of the bottom portion 10c.

An inlet of the extension side port 10d is open to the intermediate chamber L3, and a pressure in the intermediate chamber L3 acts in a direction to open the extension side valve 20. When the extension side valve 20 is opened upon receipt of the pressure in the intermediate chamber L3, liquid in the intermediate chamber L3 flows toward the compression side chamber L2 through the extension side port 10d. Meanwhile, an inlet of the compression side port 10e is open to the compression side chamber L2, and a pressure in the compression side chamber L2 acts in a direction to open the compression side valve 21. When the compression side valve 21 is opened upon receipt of the pressure in the compression side chamber L2, liquid in the compression side chamber L2 flows toward the intermediate chamber L3 through the compression side port 10e.

As described above, the main valve body 2 includes the first valve body portion 2A and the second valve body portion 2B that are vertically separable. The first valve body portion 2A has an annular shape and can be separated from and seated on the valve seat member 16 while a distal end portion thereof is being inserted into the valve seat member 16 so as to be axially movable. Meanwhile, the second valve body portion 2B has a head portion 2a and a flange portion 2b protruding from a lower end of the head portion 2a toward an outer peripheral side. A lower end of the second valve body portion 2B can be separated from and seated on the first valve body portion 2A while both the head portion 2a and the flange portion 2b are being in sliding contact with an inner periphery of the guide 15.

Furthermore, a through hole 15a open to the extension side chamber L1 is formed in the guide 15. A pressure in the extension side chamber L1 pushes up both the first valve body portion 2A and the second valve body portion 2B to act in a direction to separate the first valve body portion 2A from the valve seat member 16. When, upon receipt of the pressure in the extension side chamber L1, the first valve body portion 2A moves upward together with the second valve body portion 2B and is separated from the valve seat member 16, liquid in the extension side chamber L1 flows toward the intermediate chamber L3 through a gap formed between the first valve body portion 2A and the valve seat member 16.

The intermediate chamber L3 is formed on an inner peripheral side of the valve seat member 16, the first valve body portion 2A, and the tube portion 10b of the piston 10 and between the bottom portion 10c of the piston 10 and the second valve body portion 2B. The pressure in the intermediate chamber L3 acts in a direction to push down the first valve body portion 2A and in a direction to push up the second valve body portion 2B. That is, the pressure in the intermediate chamber L3 acts in a direction to vertically separate the first valve body portion 2A and the second valve body portion 2B, i.e., to separate the second valve body portion 2B from the first valve body portion 2A. When, upon receipt of the pressure in the intermediate chamber L3, the second valve body portion 2B moves upward and is separated from the first valve body portion 2A, the liquid in the intermediate chamber L3 flows toward the extension side chamber L1 through a gap formed between the first valve body portion 2A and the second valve body portion 2B and the through hole 15a.

In summary, in this embodiment, the through hole 15a of the guide 15, the intermediate chamber L3, the extension side port 10d, and the compression side port 10e form a main passage M that causes the extension side chamber L1 and the compression side chamber L2 to communicate with each other. The main valve body 2 is provided in the main passage M, and the extension side valve 20 and the compression side valve 21 are provided in series with the main valve body 2.

A back pressure chamber L4 is formed above an upper surface of the flange portion 2b serving as a back surface of the main valve body 2. A pressure in the back pressure chamber L4 acts in a direction to push down the second valve body portion 2B together with the first valve body portion 2A. In the second valve body portion 2B, a pressure introduction passage p1, a pressure control passage p2, and a pressure reduction passage p3 are formed. The pressure introduction passage p1 is provided with an orifice O partway therein and reduces the pressure in the extension side chamber L1 to guide the pressure to the back pressure chamber L4. The pressure control passage p2 is connected to the pressure introduction passage p1 on a downstream side from the orifice O. The pressure reduction passage p3 allows only a flow of the liquid from the intermediate chamber L3 toward the back pressure chamber L4 and reduces the pressure in the intermediate chamber L3 to guide the pressure to the back pressure chamber L4.

The solenoid valve V including a solenoid S1 according to this embodiment is provided partway in the pressure control passage p2. The solenoid valve V includes a spool 3 and the solenoid S1. The spool 3 serves as a valve body that is separated from and seated on a valve seat 22 provided in the second valve body portion 2B to open and close the pressure control passage p2. The solenoid S1 applies a downward thrust to the spool 3. When the spool 3 receives the thrust of the solenoid S1 and moves downward, the spool 3 is seated on the valve seat 22 to close the pressure control passage p2. Thus, the thrust of the solenoid S1 acts in a direction to close the spool 3.

Meanwhile, the pressure in the back pressure chamber L4 acts in a direction to push up the spool 3. When the pressure in the back pressure chamber L4 increases and upward force caused by the pressure or the like exceeds downward force caused by the solenoid S1 or the like, the spool 3 moves upward and is separated from the valve seat 22 to open the pressure control passage p2. That is, the pressure in the back pressure chamber L4 acts in a direction to open the spool 3, and, when the pressure in the back pressure chamber L4 reaches a valve opening pressure of the spool 3, the spool 3 opens the pressure control passage p2. To separate and seat the spool 3 from and on the valve seat 22 to open and close the pressure control passage p2 as described above will also be referred to as "to open and close the solenoid valve V".

In this embodiment, when the solenoid valve V opens, the liquid in the back pressure chamber L4 passes through the pressure control passage p2 and flows out to an upper gap L5 formed between the head portion 2a of the second valve body portion 2B and the solenoid S1. The upper gap L5 communicates with the intermediate chamber L3 through a communication passage p4 formed in the second valve body portion 2B. Therefore, when the solenoid valve V opens, the liquid flows from the back pressure chamber L4 to the upper gap L5 through the pressure control passage p2 and also flows from the upper gap L5 to the intermediate chamber L3 through the communication passage p4. A pressure in the upper gap L5 and the pressure in the intermediate chamber L3 become substantially the same because of the communication passage p4.

The solenoid S1 according to this embodiment includes a coil 4 axially stored in the case portion 11a of the piston rod 11, a first fixed iron core 5 disposed above the coil 4, a second fixed iron core 6 disposed below the coil 4 with a gap from the first fixed iron core 5, a first movable member 7 and a second movable member 8 disposed between the first fixed iron core 5 and the second fixed iron core 6 so as to be vertically movable, a spring 9 that biases the first movable member 7 downward, a first regulating portion 90 provided integrally with the second movable member 8 to restrict an amount of downward movement of the first movable member 7 with respect to the second movable member 8, and a second regulating portion 91 provided integrally with the second fixed iron core 6 to restrict an amount of downward movement of the second movable member 8.

Herein, a direction along a center line passing through the center of the coil 4 is the axial direction of the coil 4, and "up" and "down" herein correspond to both axial sides of the coil 4. Therefore, it can be said that the first fixed iron core 5 is disposed on one axial end side of the coil 4 and the second fixed iron core 6 is disposed on the other axial end side of the coil 4. Furthermore, it can be said that the spring 9 biases the first movable member 7 toward the second fixed iron core 6, the first regulating portion 90 regulates the movement of the first movable member 7 toward the second fixed iron core 6 with respect to the second movable member 8, and the second regulating portion 91 regulates the movement of the second movable member 8 toward the second fixed iron core 6.

Hereinafter, each part included in the solenoid S1 according to this embodiment will be described in detail.

The coil 4 is integrated with a harness 40 for energization by a molding resin. The harness 40 passes through the piston rod 11, extends to the outside of the shock absorber D, and is connected to a power supply. All the first fixed iron core 5, the second fixed iron core 6, the first movable member 7, and the second movable member 8 are made from a magnetic material. When the coil 4 is energized, a magnetic flux is generated, and the magnetic flux flows in a path of the first fixed iron core 5, the first movable member 7, the second movable member 8, the second fixed iron core 6, and the case portion 11a. Then, the first movable member 7 is attracted upward toward the first fixed iron core 5, and the second movable member 8 is attracted downward toward the second fixed iron core 6.

An annular filler ring 41 made from a non-magnetic material is interposed between the first fixed iron core 5 and the second fixed iron core 6, and the filler ring 41 forms a magnetic gap between the first fixed iron core 5 and the second fixed iron core 6. The first movable member 7 and the second movable member 8 are disposed inside the filler ring 41. Both the first movable member 7 and the second movable member 8 have a bottomed tubular shape. The first movable member 7 is inserted into the second movable member 8 so as to be vertically (axially) movable, and the second movable member 8 is inserted into the filler ring 41 so as to be vertically (axially) movable.

Figure 3:
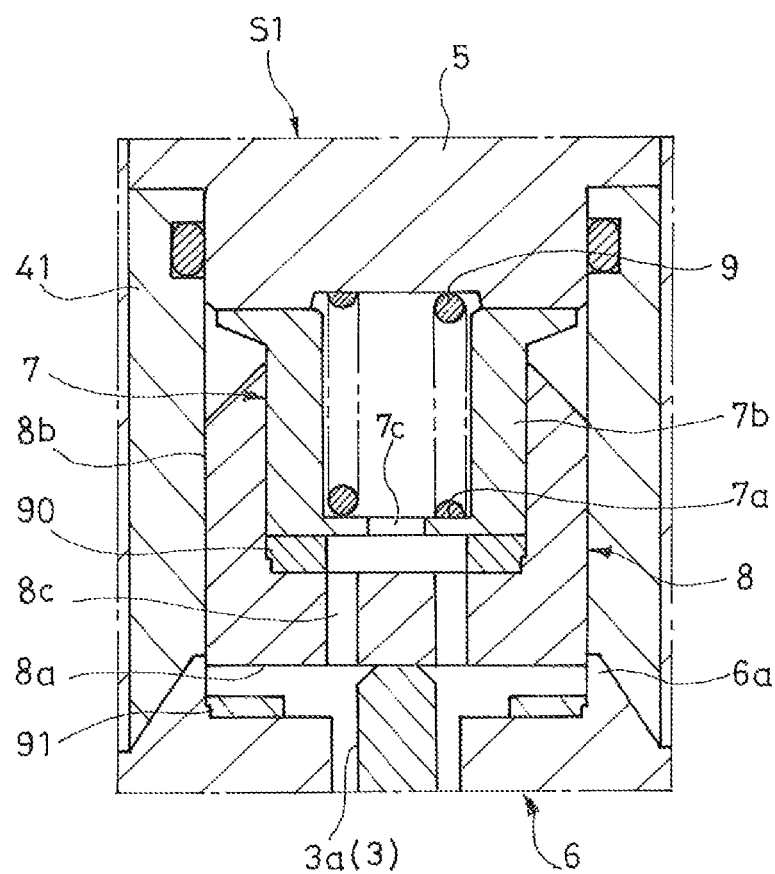
FIG. 3 is a partially enlarged cross-sectional view of the solenoid according to the first embodiment of the present invention.

As illustrated in FIG. 3, the second movable member 8 serving as an outer tube has an outer bottom portion 8a and an outer tube portion 8b standing on an outer peripheral edge of the outer bottom portion 8a. The outer bottom portion 8a faces downward (toward the second fixed iron core 6), and the outer tube portion 8b is in sliding contact with the inner periphery of the filler ring 41. Meanwhile, the first movable member 7 serving as an inner tube has an inner bottom portion 7a and an inner tube portion 7b standing on an outer peripheral edge of the inner bottom portion 7a. The inner bottom portion 7a faces downward (toward the second fixed iron core 6), and the inner tube portion 7b is in sliding contact with an inner periphery of the outer tube portion 8b.

Through holes 7c and 8c are formed in the inner bottom portion 7a of the first movable member 7 and the outer bottom portion 8a of the second movable member 8 so as to penetrate respective thicknesses thereof, and the first movable member 7 and the second movable member 8 can move vertically, individually, and freely. The spring 9 is inserted into the inner tube portion 7b of the first movable member 7. In this embodiment, the spring 9 is a coil spring, and one end of the spring 9 abuts on the inner bottom portion 7a. Meanwhile, the other end of the spring 9 is supported by the first fixed iron core 5, and the spring 9 biases the first movable member 7 downward.

The first and second regulating portions 90 and 91 are disposed on and below the outer bottom portion 8a of the second movable member 8. In this embodiment, each of the first and second regulating portions 90 and 91 is an annular member made from a non-magnetic material such as synthetic resin, rubber, or aluminum. The first regulating portion 90 is press-fitted into the inner periphery of the outer tube portion 8b of the second movable member 8. Therefore, the first regulating portion 90 vertically faces the inner bottom portion 7a of the first movable member 7 and vertically moves integrally with the second movable member 8. Meanwhile, the second regulating portion 91 is press-fitted into an inner periphery of an annular protruding portion 6a of the second fixed iron core 6 into which a lower end portion of the second movable member 8 is inserted. Therefore, the second regulating portion 91 vertically faces the outer bottom portion 8a of the second movable member 8, and the second movable member 8 vertically moves with respect to the second regulating portion 91.

When the first movable member 7 moves downward with respect to the second movable member 8, the inner bottom portion 7a of the first movable member 7 abuts on the first regulating portion 90. Then, the downward movement of the first movable member 7 with respect to the second movable member 8 is regulated, and thereafter, the first movable member 7 moves downward integrally with the second movable member 8. When the second movable member 8 moves downward, the outer bottom portion 8a of the second movable member 8 abuts on the second regulating portion 91, and the second movable member 8 does not move downward any more.

A through hole is formed at the center of the second fixed iron core 6, and a shaft portion 3a of the spool 3 is movably inserted into the through hole. A distal end of the shaft portion 3a abuts on the outer bottom portion 8a of the second movable member 8. Therefore, in a state in which the coil 4 is not energized, the first movable member 7 moves downward upon receipt of the biasing force of the spring 9 and abuts on the second movable member 8 via the first regulating portion 90. Thus, the spool 3 receives downward force caused by the biasing force of the spring 9. Meanwhile, when the coil 4 is energized to attract the first movable member 7 to the first fixed iron core 5 and attract the second movable member 8 to the second fixed iron core 6, the spring 9 is compressed by the first movable member 7 and the biasing force thereof is not transmitted to the spool 3, but the spool 3 receives downward force caused by force to attract the second movable member 8.

The first regulating portion 90 regulates an approach of the inner bottom portion 7a of the first movable member 7 and the outer bottom portion 8a of the second movable member 8 vertically (axially) facing the inner bottom portion 7a, thereby preventing the first movable member 7 and the second movable member 8 from being adsorbed to each other when the coil 4 is energized. Similarly, the second regulating portion 91 regulates an approach of the outer bottom portion 8a of the second movable member 8 and an inner portion of the annular protruding portion 6a of the second fixed iron core 6 vertically (axially) facing the outer bottom portion 8a, thereby preventing the second movable member 8 from being adsorbed to the second fixed iron core 6 when the coil 4 is energized.

Meanwhile, no regulating portion is provided between the first fixed iron core 5 and the first movable member 7, and therefore the first movable member 7 is adsorbed to the first fixed iron core 5 when the coil 4 is energized. Thus, when the coil 4 is energized and the first movable member 7 is adsorbed to the first fixed iron core 5, the spring 9 is compressed by the first movable member 7, and therefore it is possible to stably maintain a posture of the first movable member 7 that prevents the biasing force of the spring 9 from being transmitted to the second movable member 8. However, the first movable member 7 is not necessarily adsorbed to the first fixed iron core 5 when the coil 4 is energized.

Figure 4:
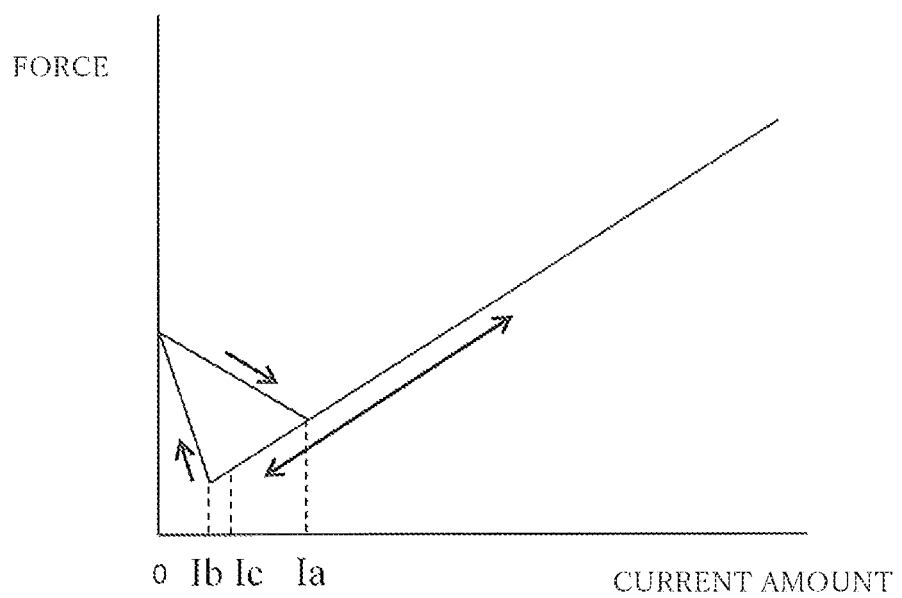
FIG. 4 is a characteristic diagram showing a relationship between an amount of current supplied to the solenoid according to the first embodiment of the present invention and force acting in a direction to push down a valve body.

FIG. 4 shows a relationship between an amount of current supplied to the solenoid S1 and force applied to the spool 3 by the solenoid S1. In FIG. 4, Ia indicates a minimum amount of current required to adsorb, to the first fixed iron core 5, the first movable member 7 separate from the first fixed iron core 5, and Ib indicates a minimum amount of current required to maintain an adsorption state of the first fixed iron core 5 and the first movable member 7 after the first movable iron core member 7 is adsorbed to the first fixed iron core 5. Note that Ic will be described later.

In a case where the amount of current supplied to the coil 4 is zero, i.e., in a case where the solenoid S1 is not energized, the first movable member 7 is pushed down by the biasing force of the spring 9 and abuts on the first regulating portion 90, and the second movable member 8 is pushed down together with the spool 3. Thus, when the solenoid S1 is not energized, the spool 3 receives the downward force caused by the spring 9 via the second movable member 8, the first regulating portion 90, and the first movable member 7. That is, when the solenoid S1 is not energized, the solenoid S1 applies the downward force caused by the biasing force of the spring 9 to the spool 3.

In a case where the amount of current supplied to the solenoid S1 is increased, the upward force to attract the first movable member 7 to the first fixed iron core 5 increases, and the downward force to attract the second movable member 8 to the second fixed iron core 6 also increases. In such a case, in a region where the amount of current supplied to the solenoid S1 is less than Ia, the biasing force of the spring 9 is transmitted to the spool 3, but the force of the spring 9 biasing the first movable member 7 downward is partially offset by the force to attract the first movable member 7 upward (toward the first fixed iron core 5). Therefore, in the region where the amount of current is less than Ia, the downward force applied to the spool 3 by the solenoid S1 decreases as the amount of current supplied to the solenoid S1 is increased.

Meanwhile, in a case where the amount of current supplied to the solenoid S1 is increased, in a region where the amount of current is equal to or larger than Ia, the first movable member 7 is attracted toward the first fixed iron core 5 and adsorbed thereto against the biasing force of the spring 9. In such a state, the biasing force of the spring 9 is not transmitted to the second movable member 8, and only the force to attract the second movable member 8 to the second fixed iron core 6 acts in the direction to push down the spool 3. The downward force to attract the second movable member 8 increases in proportion to the amount of current supplied to the solenoid S1. Therefore, in the region where the amount of current supplied to the solenoid S1 is equal to or larger than Ia, the downward force applied to the spool 3 by the solenoid S1 increases in proportion to the amount of current supplied to the solenoid S1, i.e., as the amount of current is increased.

On the contrary, in a case where the amount of current supplied to the solenoid S1 is reduced from a state in which the first movable member 7 is adsorbed to the first fixed 5 and the biasing force of the spring 9 is not transmitted to the second movable iron core member 8, the upward force to attract the first movable member 7 to the first fixed iron core 5 decreases, and the downward force to attract the second movable member 8 to the second fixed iron core 6 also decreases. Even in such a case, the state in which the first movable member 7 is adsorbed to the first fixed iron core 5 and the biasing force of the spring 9 is not transmitted to the second movable member 8 is maintained in a region where the amount of current supplied to the solenoid S1 is equal to or larger than Ib. Therefore, in the region where the amount of current supplied to the solenoid S1 is equal to or larger than Ib, the downward force applied to the spool 3 by the solenoid S1 decreases in proportion to the amount of current supplied to the solenoid S1, i.e., as the amount of current is decreased.

Meanwhile, in a case where the amount of current supplied to the solenoid S1 is reduced from the state in which the first movable member 7 is adsorbed to the first fixed iron core 5 and the biasing force of the spring 9 is not transmitted to the second movable member 8 and the amount of current becomes less than Ib, the adsorption state of the first movable member 7 and the first fixed iron core 5 is released by the biasing force of the spring 9. Thus, the biasing force of the spring 9 is transmitted to the second movable member 8. Therefore, in the region where the amount of current is less than Ib, the downward force applied to the spool 3 by the solenoid S1 increases as the amount of current supplied to the solenoid S1 is decreased.

As can be seen from FIG. 4, Ib indicating the minimum amount of current required to maintain the adsorption of the first movable member 7 and the first fixed iron core 5 is smaller than Ia indicating the minimum amount of current required to adsorb, to the first fixed iron core 5, the first movable member 7 separate from the first fixed iron core 5 (Ia>Ib). Therefore, a characteristic of the force applied to the spool 3 by the solenoid S1 with respect to the amount of current supplied to the solenoid S1 has a hysteresis. Note that, in order to facilitate understanding, FIG. 4 exaggeratedly shows a region where the amount of current supplied to the solenoid S1 is small.

In this embodiment, in order to control the amount of current supplied to the solenoid S1 to control the force applied to the spool 3 by the solenoid S1, the current equal to or larger than Ia is supplied once to adsorb the first movable member 7 to the first fixed iron core 5, and then the amount of current supplied to the solenoid S1 is controlled within a range equal to or larger than Ic that is larger than Ib. Therefore, the state in which the first movable member 7 is adsorbed to the first fixed iron core 5 is maintained in a normal condition in which an energization amount to the solenoid S1 is controlled. Thus, the amount of current supplied to the solenoid S1 and the downward force applied to the spool 3 by the solenoid S1 are in a proportional relationship, and therefore the force increases as the amount of current supplied to the solenoid S1 is increased.

The force applied to the spool 3 by the solenoid S1 due to magnetic force generated by energization of the solenoid S1 in the normal condition (controlled condition) is referred to as "thrust" of the solenoid S1. That is, the thrust of the solenoid S1 is controlled by controlling the amount of current supplied to the solenoid S1. In this embodiment, the amount of current supplied to the solenoid S1 and the thrust applied to the spool 3 by the solenoid S1 are in a proportional relationship, and the thrust increases as the current supply amount is increased, whereas the thrust decreases as the current supply amount is decreased.

Meanwhile, during a failure in which the solenoid S1 is not energized, the spool 3 is biased downward by the spring 9 of the solenoid S1, and the biasing force is determined in advance according to a specification of the spring 9 such as a spring constant. A direction of the biasing force of the spring 9 that biases the spool 3 during the failure (when the solenoid is not energized) is the same as the direction of the thrust applied to the spool 3 in the normal condition.

Hereinafter, operation of the shock absorber D provided with the solenoid valve V including the solenoid S1 according to this embodiment will be described.

When the shock absorber D extends and the piston 10 moves upward in the cylinder 1 to compress the extension side chamber L1 and increase the pressure in the extension side chamber L1, the liquid in the extension side chamber L1 flows into the back pressure chamber L4 through the pressure introduction passage p1 to increase the pressure in the back pressure chamber L4. Then, when the pressure in the back pressure chamber L4 reaches the valve opening pressure of the spool 3, the spool 3 (solenoid valve V) opens, and the liquid in the back pressure chamber L4 flows toward the intermediate chamber L3 through the pressure control passage p2, the upper gap L5, and the communication passage p4. Therefore, when the shock absorber D extends, the pressure in the back pressure chamber L4 is controlled to become the valve opening pressure of the solenoid valve V.

Furthermore, when the shock absorber D extends and the upward force caused by the pressure or the like in the extension side chamber L1 and acting on the first valve body portion 2A and the second valve body portion 2B exceeds the downward force caused by the pressure or the like in the back pressure chamber L4, the first valve body portion 2A and the second valve body portion 2B move upward. Then, a gap is formed between the first valve body portion 2A and the valve seat member 16, and the liquid in the extension side chamber L1 moves to the intermediate chamber L3 through the gap, and the liquid in the intermediate chamber L3 opens the extension side valve 20 and moves to the compression side chamber L2.

Thus, when the shock absorber D extends, the first valve body portion 2A of the main valve body 2 and the extension side valve 20 are opened, and the main valve body 2 and the extension side valve 20 apply resistance to a flow of the liquid from the extension side chamber L1 toward the compression side chamber L2 through the main passage M. Therefore, the pressure in the extension side chamber L1 increases when the shock absorber D extends, and the shock absorber D exerts extension side damping force that prevents an extension operation thereof.

In the normal condition in which the energization amount to the solenoid S1 is controlled, the thrust of the solenoid S1 acting on the spool 3 downward (in a closing direction) increases as the amount of current supplied to the solenoid S1 is increased. Therefore, the valve opening pressure of the spool 3 (solenoid valve V) increases as the amount of current supplied to the solenoid S1 is increased, thereby increasing the pressure in the back pressure chamber L4.

The pressure in the back pressure chamber L4 acts downward (in the closing direction) on the second valve body portion 2B and the first valve body portion 2A, and thus a valve opening pressure of the first valve body portion 2A of the main valve body 2 increases as the amount of current supplied to the solenoid S1 is increased to increase the pressure in the back pressure chamber L4, thereby increasing the extension side damping force to be generated. Thus, in the normal condition, a magnitude of the extension side damping force is adjusted by adjusting the valve opening pressure of the spool 3 by using the solenoid S1. Note that FIGS. 2 and 3 illustrate a state in which the spool 3 is opened in the normal condition.

Meanwhile, during a failure in which the solenoid S1 is not energized, the valve opening pressure of the spool 3 (solenoid valve V) is determined according to the biasing force of the spring 9. Therefore, the pressure in the back pressure chamber L4 during the failure is determined according to the specification of the spring 9, and thus the extension side damping force to be generated is determined. Because the biasing force of the spring 9 is not transmitted to the spool 3 in the normal condition as described above, the specification of the spring 9 can be freely set without considering the extension side damping force in the normal condition.

On the contrary, when the shock absorber D contracts and the piston 10 moves downward in the cylinder 1 to compress the compression side chamber L2 and increase the pressure in the compression side chamber L2, the liquid in the compression side chamber L2 opens the compression side valve 21 and moves to the intermediate chamber L3, and the liquid in the intermediate chamber L3 moves to the back pressure chamber L4 through the pressure reduction passage p3. At this time, the pressure in the upper gap L5 located on a downstream side of the spool 3 is substantially equal to the pressure in the intermediate chamber L3 and is higher than the pressure in the back pressure chamber L4 located on an upstream side of the spool 3. Therefore, the spool 3 is maintained in a closed state. In such a state, the thrust of the solenoid S1 acts downward on the second valve body portion 2B via the spool 3.

As described above, the pressure in the intermediate chamber L3 acts upward only on the second valve body portion 2B. Therefore, when the upward force caused by the pressure or the like in the intermediate chamber L3 and acting on the second valve body portion 2B exceeds the downward force caused by the thrust or the like of the solenoid S1, only the second valve body portion 2B moves upward. Then, a gap is formed between the second valve body portion 2B and the first valve body portion 2A, and the liquid in the intermediate chamber L3 moves to the extension side chamber L1 through the gap.

Thus, when the shock absorber D contracts, the compression side valve 21 and the second valve body portion 2B of the main valve body 2 are opened, and the compression side valve 21 and the main valve body 2 apply resistance to a flow of the liquid from the compression side chamber L2 toward the extension side chamber L1 through the main passage M. Therefore, the pressure in the compression side chamber L2 increases when the shock absorber D contracts, and the shock absorber D exerts compression side damping force that prevents a contraction operation thereof.

In the normal condition in which the energization amount to the solenoid S1 is controlled, the downward (closing direction) force acting on the second valve body portion 2B increases as the amount of current supplied to the solenoid S1 is increased to increase the thrust of the solenoid S1. Therefore, a valve opening pressure of the second valve body portion 2B of the main valve body 2 increases as the amount of current supplied to the solenoid S1 is increased to increase the thrust of the solenoid S1, thereby increasing the compression side damping force to be generated. Thus, in the normal condition, a magnitude of the compression side damping force is adjusted by adjusting the force to push the second valve body portion 2B downward via the spool 3 by using the solenoid S1.

Meanwhile, during a failure in which the solenoid S1 is not energized, the biasing force of the spring 9 is transmitted to the second valve body portion 2B via the spool 3. Therefore, the compression side damping force during the failure is also determined according to the specification of the spring 9. Because the biasing force of the spring 9 is not transmitted to the spool 3 in the normal condition as described above, the specification of the spring 9 can be freely set without considering the compression side damping force in the normal condition.

Hereinafter, effects of the solenoid S1 according to this embodiment, the solenoid valve V including the solenoid S1, and the shock absorber D provided with the solenoid valve V including the solenoid S1 will be described.

The solenoid S1 according to this embodiment includes: the coil 4; the first fixed iron core 5 located on one axial end side of the coil 4; the second fixed iron core 6 located on the other axial end side of the coil 4 with a gap from the first fixed iron core 5; the first movable member 7 disposed between the first fixed iron core 5 and the second fixed iron core 6 and configured to be attracted to the first fixed iron core 5 by energization of the coil 4; the second movable member 8 disposed between the first fixed iron core 5 and the second fixed iron core 6 and configured to be attracted to the second fixed iron core 6 by energization of the coil 4; the spring 9 configured to bias the first movable member 7 toward the second fixed iron core 6; and the first regulating portion 90 made from a non-magnetic material, provided integrally with the second movable member 8, and configured to regulate movement of the first movable member 7 toward the second fixed iron core 6 with respect to the second movable member 8.

According to the above configuration, when the solenoid S1 is not energized, the first movable member 7 receives the biasing force of the spring 9 and moves toward the second fixed iron core 6, and, when the first regulating portion 90 regulates the movement of the first movable member 7 toward the second fixed iron core 6 with respect to the second movable member 8, the first movable member 7 and the second movable member 8 integrally move toward the second fixed iron core 6. Therefore, when the solenoid S1 is not energized, the biasing force of the spring 9 is transmitted from the first movable member 7 to the second movable member 8.

Meanwhile, when the solenoid S1 is energized, the first movable member 7 is attracted to the first fixed iron core 5 and moves in the attraction direction, the spring 9 is compressed by the first movable member 7, and therefore the biasing force of the spring 9 is not transmitted to the second movable member 8. Furthermore, when the solenoid S1 is energized, the second movable member 8 is attracted to the second fixed iron core 6, and the force to attract the second movable member 8 to the second fixed iron core 6 increases as the amount of current supplied to the solenoid S1 is increased.

Therefore, when the solenoid S1 is energized and the force to attract the second movable member 8 is applied to an object such as the spool 3 as the thrust, the thrust applied to the object increases as the amount of current supplied to the solenoid S1 is increased, whereas the thrust applied to the object decreases as the amount of current supplied to the solenoid S1 is decreased. When the solenoid is not energized, the biasing force of the spring 9 acts on the object via the first movable member 7 and the second movable member 8. The direction of the biasing force of the spring 9 is the same as the direction of the force to attract the second movable member 8 when the solenoid S1 is energized. Therefore, according to the above configuration, even when the solenoid S1 is not energized, the object can be biased in the same direction as that when the solenoid is energized.

According to the above configuration, as described above, when the solenoid S1 is energized and the first movable member 7 moves toward the first fixed iron core 5 against the biasing force of the spring 9, the biasing force of the spring 9 is not transmitted to the second movable member 8, and is thus not transmitted to the spool (object) 3. Therefore, it is possible to individually and freely set the thrust of the solenoid S1 when the solenoid S1 is energized and the biasing force applied to the object by the spring 9 when the solenoid S1 is not energized. The spring 9 is a coil spring in this embodiment, but may be a spring other than the coil spring, such as a disc spring.

In the solenoid S1 according to this embodiment, the first regulating portion 90 that regulates the movement of the first movable member 7 toward the second fixed iron core 6 with respect to the second movable member 8 is made from a non-magnetic material. This makes it possible to prevent the first movable member 7 and the second movable member 8 from being adsorbed to each other when the coil 4 is energized. Furthermore, in the solenoid S1 according to this embodiment, the first regulating portion 90 is provided integrally with the second movable member 8. Therefore, for example, when a PWM control current is applied to the solenoid S1, the first movable member 7 and the second movable member 8 vibrate to excite and vibrate the first regulating portion 90, thereby preventing an increase in high frequency sound.

The solenoid S1 according to this embodiment further includes the second regulating portion 91 made from a non-magnetic material, provided integrally with the second fixed iron core 6, and configured to regulate movement of the second movable member 8 toward the second fixed iron core 6. According to the configuration, it is possible to prevent the second movable member 8 from being adsorbed to the second fixed iron core 6 when the coil 4 is energized. Furthermore, for example, when the PWM control current is applied to the solenoid S1, the second movable member 8 vibrates to excite and vibrate the second regulating portion 91, thereby preventing an increase in high frequency sound.

The solenoid S1 according to this embodiment includes the annular filler ring 41 interposed between the first fixed iron core 5 and the second fixed iron core 6. The second movable member 8 has a bottomed tubular shape, has the outer bottom portion 8a and the outer tube portion 8b standing on the outer peripheral edge of the outer bottom portion 8a, and is inserted into the filler ring 41 so as to be axially movable while the outer bottom portion 8a is facing the second fixed iron core 6. The first movable member 7 also has a bottomed tubular shape and has the inner bottom portion 7a and the inner tube portion 7b standing on the outer peripheral edge of the inner bottom portion 7a. The inner tube portion 7b is inserted into the outer tube portion 8b of the second movable member 8 so as to be axially movable while the inner bottom portion 7a is facing the second fixed iron core 6. The spring 9 is interposed between the inner bottom portion 7a and the first fixed iron core 5 so that one end side of the spring 9 is inserted into the inner tube portion 7b of the first movable member 7.

According to the above configuration, in a case where the inner tube portion 7b of the first movable member 7 and the outer tube portion 8b of the second movable member 8 are made from a magnetic material, a magnetic path passes through the first fixed iron core 5, the first movable member 7, the second movable member 8, and the second fixed iron core 6 when the coil 4 is excited, thereby attracting the first movable member 7 to the first fixed iron core 5 and attracting the second movable member 8 to the second fixed iron core 6. Furthermore, it is possible to reduce the first movable member 7 and the second movable member 8 in size while securing a space for storing the spring 9 inside the first movable member 7. This makes it possible to reduce the solenoid S1 in size.

According to the above configuration, when the first movable member 7 moves toward the second fixed iron core 6, the inner bottom portion 7a of the first movable member 7 approaches the outer bottom portion 8a of the second movable member 8. Therefore, in a case where the first regulating portion 90 is disposed to regulate the movement thereof in the approaching direction, it is possible to regulate the movement of the first movable member 7 toward the second fixed iron core 6 with respect to the second movable member 8. In order to dispose the first regulating portion 90 as described above, for example, it is only required to dispose the first regulating portion 90 between the inner bottom portion 7a and the outer bottom portion 8a as in this embodiment, which is easy. That is, according to the above configuration, the first regulating portion 90 can be easily disposed.

Similarly, according to the above configuration, when the second movable member 8 moves toward the second fixed iron core 6, the outer bottom portion 8a of the second movable member 8 approaches the second fixed iron core 6. Therefore, in a case where the second regulating portion 91 is disposed to regulate the movement thereof in the approaching direction, it is possible to regulate the movement of the second movable member 8 toward the second fixed iron core 6. In order to dispose the second regulating portion 91 as described above, for example, it is only required to dispose the second regulating portion 91 between the outer bottom portion 8a and the second fixed iron core 6 as in this embodiment, which is easy. That is, according to the above configuration, the second regulating portion 91 can be easily disposed.

Both the first and second regulating portions 90 and 91 of the solenoid S1 according to this embodiment are annular members. The first regulating portion 90 is press-fitted into the inner periphery of the outer tube portion 8b of the second movable member 8. Meanwhile, the second regulating portion 91 is press-fitted into the inner periphery of the annular protruding portion 6a of the second fixed iron core 6. Thus, in the solenoid S1 according to this embodiment, the first and second regulating portions 90 and 91 are integrated with the second movable member 8 or the second fixed iron core 6 by press-fitting. Therefore, even in a case where the second movable member 8 and the second fixed iron core 6 are made from a magnetic material and the first and second regulating portions 90 and 91 are made from a non-magnetic material, those members can be integrally provided with ease.

Figure 5:
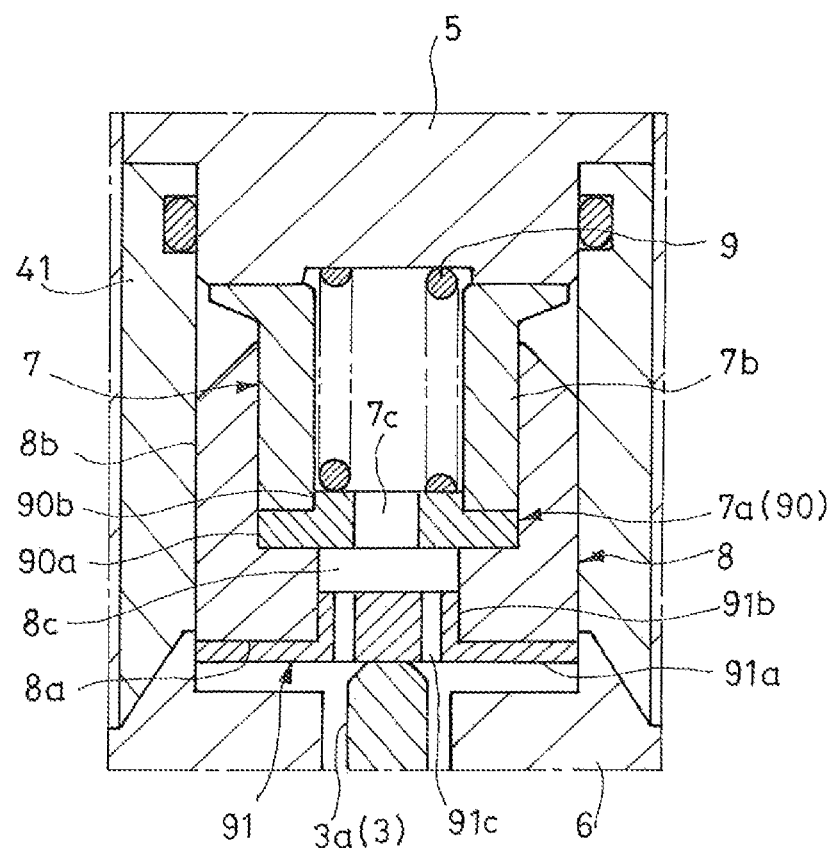
FIG. 5 illustrates a first modification example of the solenoid according to the first embodiment of the present invention and is a partially enlarged cross-sectional view of the solenoid according to the modification example.
Figure 6:
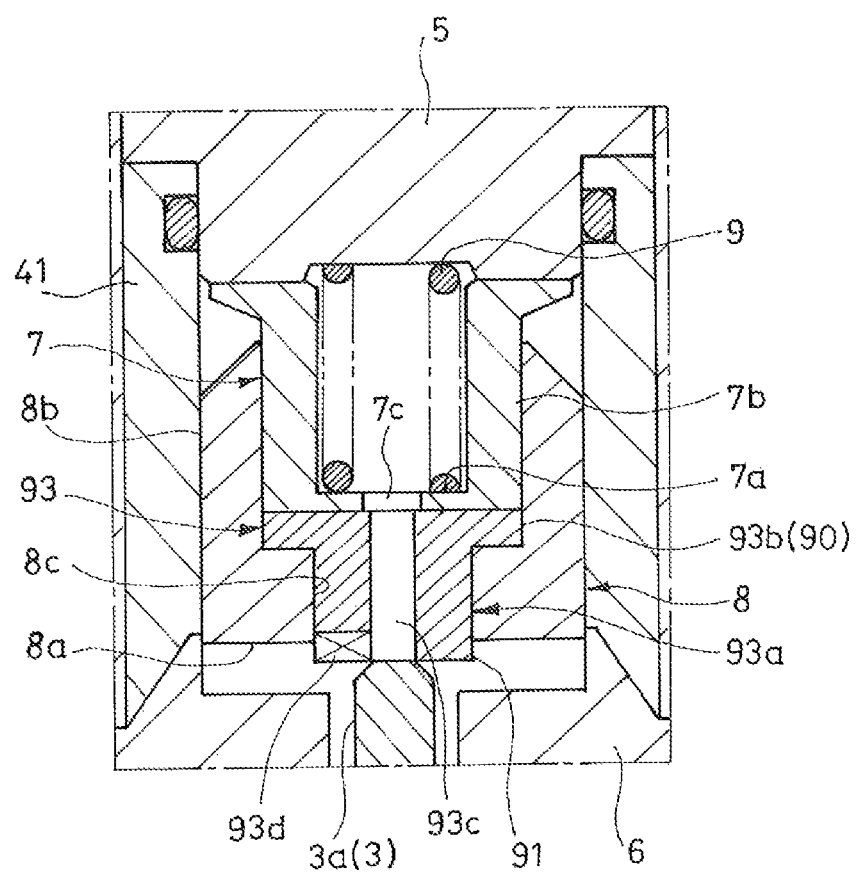
FIG. 6 illustrates a second modification example of the solenoid according to the first embodiment of the present invention and is a partially enlarged cross-sectional view of the solenoid according to the modification example.
Figure 7:
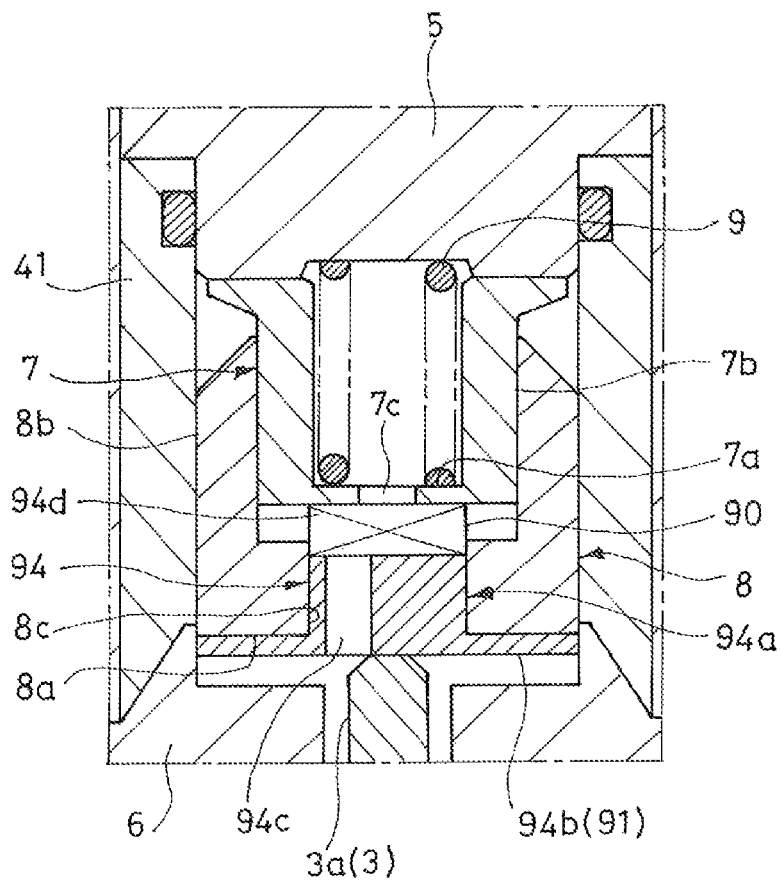
FIG. 7 illustrates a third modification example of the solenoid according to the first embodiment of the present invention and is a partially enlarged cross-sectional view of the solenoid according to the modification example.

The first regulating portion 90 may be provided integrally with the first movable member 7, and a configuration for providing the first regulating portion 90 integrally with the first movable member 7 or the second movable member 8 can also be appropriately changed. Furthermore, the second regulating portion 91 may be provided integrally with the second movable member 8, and a configuration for providing the second regulating portion 91 integrally with the second movable member 8 or the second fixed iron core 6 can also be appropriately changed. FIGS. 5 to 7 illustrate modification examples of the first and second regulating portions 90 and 91. Hereinafter, each modification example of the solenoid S1 according to this embodiment will be specifically described.

In a first modification example of the solenoid S1 according to this embodiment, as illustrated in FIG. 5, the inner bottom portion 7a of the first movable member 7 is made from a non-magnetic material, and the inner bottom portion 7a functions as the first regulating portion 90. In the first modification example, the second regulating portion 91 is provided integrally with the second movable member 8 and vertically moves together with the second movable member 8.

More specifically, the inner bottom portion 7a of the first movable member 7 functioning as the first regulating portion 90 includes a seat portion 90a and a fitting portion 90b. The seat portion 90a is located between the inner tube portion 7b and the outer bottom portion 8a of the second movable member 8 both of which are made from a magnetic material. The fitting portion 90b protrudes from the seat portion 90a and is press-fitted into an inner periphery of the inner tube portion 7b. Meanwhile, the second regulating portion 91 includes a seat portion 91a and a fitting portion 91b. The seat portion 91a is located between the outer bottom portion 8a of the second movable member 8 and the second fixed iron core 6. The fitting portion 91b protrudes from the seat portion 91a and is press-fitted into the through hole 8c formed in the outer bottom portion 8a.

According to the above configuration, when the first movable member 7 moves toward the second fixed iron core 6 with respect to the second movable member 8 and the seat portion 90a of the inner bottom portion 7a functioning as the first regulating portion 90 abuts on the outer bottom portion 8a, the movement of the first movable member 7 toward the second fixed iron core 6 with respect to the second movable member 8 is regulated, and the first movable member 7 and the second movable member 8 integrally move toward the second fixed iron core 6. When the second movable member 8 moves toward the second fixed iron core 6 and the seat portion 91a of the second regulating portion 91 abuts on the second fixed iron core 6, the movement of the second movable member 8 toward the second fixed iron core 6 is regulated.

Both the seat portions 90a and 91a of the first and second regulating portions 90 and 91 are made from a non-magnetic material, and therefore it is possible to prevent the first movable member 7 and the second movable member 8 from being adsorbed to each other and the second movable member 8 from being adsorbed to the second fixed iron core 6 when the coil is energized. Furthermore, a hole 91c is formed in the fitting portion 91b of the second regulating portion 91 so as to axially penetrate the fitting portion 91b. This prevents the through hole 8c of the outer bottom portion 8a from being blocked by the fitting portion 91b.

In a second modification example of the solenoid S1 according to this embodiment, as illustrated in FIG. 6, a regulating member 93 is attached to the outer bottom portion 8a of the second movable member 8. The regulating member 93 has an insertion shaft 93a and a seat portion 93b. The insertion shaft 93a is press-fitted into the through hole 8c formed in the outer bottom portion 8a while one end of the regulating member 93 is protruding from the outer bottom portion 8a toward the second fixed iron core 6. The seat portion 93b is located between the outer bottom portion 8a and the inner bottom portion 7a of the first movable member 7 so as to protrude from the other end of the insertion shaft 93a toward the outer peripheral side. The seat portion 93b functions as the first regulating portion 90, and one end portion of the insertion shaft 93a protruding from the outer bottom portion 8a toward the second fixed iron core 6 functions as the second regulating portion 91.

According to the above configuration, when the first movable member 7 moves toward the second fixed iron core 6 with respect to the second movable member 8 and the inner bottom portion 7a of the first movable member 7 abuts on the seat portion 93b of the regulating member 93 functioning as the first regulating portion 90, the movement of the first movable member 7 toward the second fixed iron core 6 with respect to the second movable member 8 is regulated, and the first movable member 7 and the second movable member 8 integrally move toward the second fixed iron core 6. When the second movable member 8 moves toward the second fixed iron core 6 and the one end portion of the insertion shaft 93a functioning as the second regulating portion 91 abuts on the second fixed iron core 6, the movement of the second movable member 8 toward the second fixed iron core 6 is regulated.

The regulating member 93 including the first and second regulating portions 90 and 91 is made from a non-magnetic material, and therefore it is possible to prevent the first movable member 7 and the second movable member 8 from being adsorbed to each other and the second movable member 8 from being adsorbed to the second fixed iron core 6 when the coil is energized. Furthermore, a hole 93c is formed in the insertion shaft 93a of the regulating member 93 so as to axially penetrate the insertion shaft 93a, and a notch 93d communicating with the hole 93c is formed in one end portion thereof. This prevents the through hole 8c of the outer bottom portion 8a from being blocked by the regulating member 93.

In a third modification example of the solenoid S1 according to this embodiment, as illustrated in FIG. 7, a regulating member 94 is attached to the outer bottom portion 8a of the second movable member 8. The regulating member 94 has an insertion shaft 94a and a seat portion 94b. The insertion shaft 94a is press-fitted into the through hole 8c formed in the outer bottom portion 8a while one end of the regulating member 94 is protruding from the outer bottom portion 8a toward the first fixed iron core 5. The seat portion 94b is located between the outer bottom portion 8a and the second fixed iron core 6 so as to protrude from the other end of the insertion shaft 94a toward the outer peripheral side. One end portion of the insertion shaft 94a protruding from the outer bottom portion 8a toward the first fixed iron core 5 functions as the first regulating portion 90, and the seat portion 94b functions as the second regulating portion 91.

According to the above configuration, when the first movable member 7 moves toward the second fixed iron core 6 with respect to the second movable member 8 and the inner bottom portion 7a of the first movable member 7 abuts on a distal end portion of the insertion shaft 94a functioning as the first regulating portion 90, the movement of the first movable member 7 toward the second fixed iron core 6 with respect to the second movable member 8 is regulated, and the first movable member 7 and the second movable member 8 integrally move toward the second fixed iron core 6. When the second movable member 8 moves toward the second fixed iron core 6 and the seat portion 94*b* of the regulating member 94 functioning as the second regulating portion 91 abuts on the second fixed iron core 6, the movement of the second movable member 8 toward the second fixed iron core 6 is regulated.

The regulating member 94 including the first and second regulating portions 90 and 91 is made from a non-magnetic material, and therefore it is possible to prevent the first movable member 7 and the second movable member 8 from being adsorbed to each other and the second movable member 8 from being adsorbed to the second fixed iron core 6 when the coil is energized. Furthermore, a hole 94*c* is formed in the insertion shaft 94*a* of the regulating member 94 so as to axially penetrate the insertion shaft 94*a*, and a notch 94*d* communicating with the hole 94*c* is formed in one end portion thereof. This prevents the through hole 8*c* of the outer bottom portion 8*a* from being blocked by the regulating member 94.

Thus, in the solenoid S1 according to this embodiment, the first and second regulating portions 90 and 91 are provided integrally with the first movable member 7, the second movable member 8, or the second fixed iron core 6 by press-fitting. However, a method therefor is not limited to press-fitting, and may be, for example, screwing, bonding, or screw fastening.

The solenoid S1 according to this embodiment and the spool (valve body) 3 that opens and closes the pressure control passage p2 constitute the solenoid valve V. The solenoid S1 applies the force to attract the second movable member 8 toward the second fixed iron core 6, the force being generated when the coil 4 is energized, to the spool (valve body) 3 in a direction to close the pressure control passage p2. Therefore, the valve opening pressure of the solenoid valve V can be adjusted by changing the amount of current supplied to the solenoid S1, and a pressure on an upstream side from the solenoid valve V can be set to the valve opening pressure of the solenoid valve V.

Furthermore, as described above, in the solenoid S1 according to this embodiment, when the solenoid S1 is energized, the thrust applied to the object can be increased as the amount of current supplied thereto increases. Therefore, in the solenoid valve V including the solenoid S1 according to this embodiment, the valve opening pressure of the spool 3 can be increased as the amount of current supplied to the solenoid S1 is increased. Furthermore, as described above, in the solenoid S1 according to this embodiment, even when the solenoid S1 is not energized, the object can be biased by the spring 9 in the same direction as that of the thrust when the solenoid S1 is energized. Therefore, in the solenoid valve V including the solenoid S1 according to this embodiment, the valve opening pressure when the solenoid S1 is not energized can be determined according to the specification of the spring 9.

The solenoid valve V including the solenoid S1 according to this embodiment is provided in the shock absorber D. The shock absorber D includes the solenoid valve V, the cylinder 1, the piston rod 11 inserted into the cylinder 1 so as to be axially movable, the main passage M through which liquid flows when the cylinder 1 and the piston rod 11 axially and relatively move, the main valve body 2 configured to open and close the main passage M, the pressure introduction passage p1 provided with the orifice O partway therein and configured to reduce a pressure on an upstream side from the main valve body 2 of the main passage M and guide the pressure to the back surface of the main valve body 2, and the pressure control passage p2 provided with the solenoid valve V and connected to the pressure introduction passage p1 on a downstream side from the orifice O.

According to the above configuration, when the cylinder 1 and the piston rod 11 axially and relatively move, the main valve body 2 applies resistance to a flow of the liquid passing through the main passage M. Thus, damping force caused by the resistance is generated. The back pressure of the main valve body 2 is set to the valve opening pressure of the solenoid valve V, and therefore the back pressure of the main valve body 2 can be adjusted by changing the amount of current supplied to the solenoid S1. The first valve body portion 2A of the main valve body 2 is less likely to open as the back pressure of the main valve body 2 is increased, thereby increasing the extension side damping force to be generated. Therefore, according to the above configuration, the magnitude of the extension side damping force to be generated can be adjusted by changing the amount of current supplied to the solenoid S1.

Furthermore, as described above, in the solenoid valve V including the solenoid S1 according to this embodiment, the valve opening pressure of the solenoid valve V can be increased as the amount of current supplied to the solenoid S1 is increased. Therefore, in the shock absorber D provided with the solenoid valve V including the solenoid S1 according to this embodiment, the back pressure of the main valve body 2 can be increased as the amount of current supplied to the solenoid S1 is increased, thereby increasing the extension side damping force to be generated.

That is, in a case where the amount of current supplied to the solenoid S1 is small, the shock absorber D can reduce the extension side damping force to be generated. Therefore, in a case where the shock absorber D is used for the suspension of the vehicle, it is possible to reduce power consumption during normal traveling. This restrains heat generation of the solenoid S1 and reduces a change in temperature of the shock absorber D. Therefore, it is possible to reduce a change in damping force characteristic (a characteristic of damping force with respect to a piston speed) caused by a change in temperature of the liquid.

Furthermore, as described above, in the solenoid valve V including the solenoid S1 according to this embodiment, the valve opening pressure when the solenoid S1 is not energized can be determined according to the specification of the spring 9. Therefore, in the shock absorber D provided with the solenoid valve V including the solenoid S1 according to this embodiment, the back pressure of the main valve body 2 can be increased even when the solenoid S1 is not energized. With this, the shock absorber D can prevent insufficiency of the extension side damping force even during a failure in which the solenoid S1 is not energized. Furthermore, the shock absorber D is only required to provide the pressure control passage p2 as a passage connected to the back pressure chamber L4 to set the back pressure of the main valve body 2 and is not required to switch the passage connected to the back pressure chamber L4 between when the solenoid S1 is energized and when the solenoid S1 is not energized. This makes it possible to restrain the structure of the shock absorber D from being complicated and to reduce costs.

In this embodiment, the back pressure of the main valve body 2 is controlled by the solenoid valve V only when the shock absorber D extends, and, when the shock absorber D contracts, the thrust of the solenoid S1 in the solenoid valve V directly acts on the main valve body 2 in the closing direction. However, as a matter of course, the back pressure of the main valve body may be controlled by the solenoid valve V when the shock absorber D contracts.

The rod that moves in and out of the cylinder 1 is not necessarily a piston rod to which a piston is attached, and a position of the main valve body whose back pressure is controlled by the solenoid valve V is not limited to a piston portion. For example, in a case where the shock absorber includes a reservoir as described above, the main valve body may be provided in the main passage serving as a passage connecting an extension side chamber or a compression side chamber and the reservoir, and the back pressure of the main valve body may be controlled by the solenoid valve V. Furthermore, in a case where the shock absorber is a uniflow shock absorber and liquid circulates in one direction through the extension side chamber, the reservoir, and the compression side chamber in this order when the shock absorber extends or contracts, the main valve body may be provided in the main passage serving as a circulation passage that causes the extension side chamber and the reservoir to communicate with each other, and the back pressure of the main valve body may be controlled by the solenoid valve V.

Second Embodiment

Figure 8:
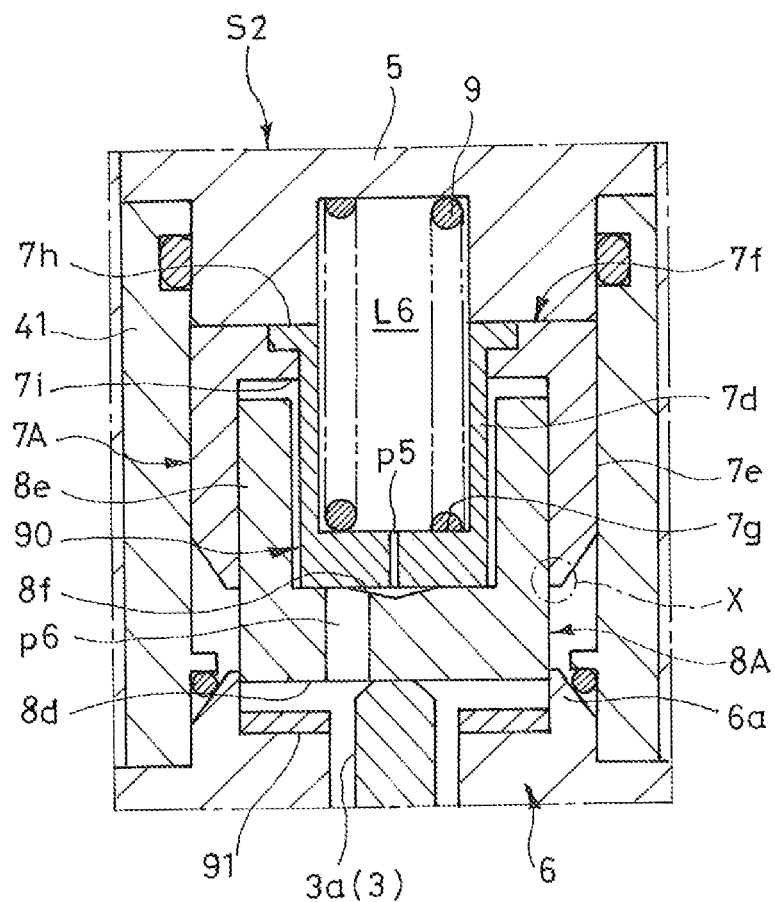
FIG. 8(a) is a partially enlarged cross-sectional view of a solenoid according to a second embodiment of the present invention.
FIG. 8(b) is an enlarged view of a part X of FIG. 8(a).
Figure 8:
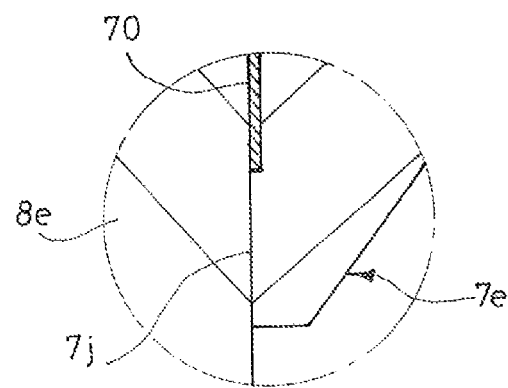

A solenoid S2 according to a second embodiment of the present invention illustrated in FIG. 8 will be described. The solenoid S2 according to this embodiment, as well as the solenoid S1 according to the first embodiment, is used for a solenoid valve, and the solenoid S1 according to the first embodiment illustrated in FIG. 2 can be replaced with the solenoid S2 according to this embodiment as it is. A basic structure of the solenoid S2 according to this embodiment is similar to that of the solenoid S1 according to the first embodiment, and the same configurations are denoted by the same reference signs, and detailed description thereof will be omitted.

A major difference between the solenoid S2 according to this embodiment and the solenoid S1 according to the first embodiment is that the first movable member and the second movable member are reversely disposed in an inside-outside relationship. More specifically, in this embodiment, a first movable member 7A has an inner tube portion 7d and an outer tube portion 7e disposed on inner and outer sides in a double manner, a connecting portion 7f connecting one axial ends of those tube portions, and an inner bottom portion 7g located at the other end of the inner tube portion 7d. The outer tube portion 7e is in sliding contact with the inner periphery of the filler ring 41 while the inner bottom portion 7g is facing downward (toward the second fixed iron core 6). Meanwhile, a second movable member 8A has a bottomed tubular shape, is made from a magnetic material, and has an outer bottom portion 8d and an intermediate tube portion 8e standing on an outer peripheral edge of the outer bottom portion 8d. The intermediate tube portion 8e is in sliding contact with an inner periphery of the outer tube portion 7e of the first movable member 7A while the outer bottom portion 8d is facing downward (toward the second fixed iron core 6).

An outer peripheral side and inner peripheral side of the first movable member 7A, which are separated partway in the connecting portion 7f, are made from different materials. A portion including the outer tube portion 7e on the outer peripheral side is made from a magnetic material, and a portion including the inner tube portion 7d on the inner peripheral side is made from a non-magnetic material. In the connecting portion 7f, an annular portion 7h connected to the inner tube portion 7d is disposed to be placed on an upper portion (on the first fixed iron core 5 side) of an annular portion 7i connected to the outer tube portion 7e. The spring 9 is inserted into the inner tube portion 7d. Also in this embodiment, the spring 9 is a coil spring, and one end of the spring 9 abuts on the inner bottom portion 7g. Meanwhile, the other end of the spring 9 is supported by the first fixed iron core 5, and the spring 9 biases the inner bottom portion 7g of the first movable member 7A downward.

As described above, the annular portion 7h connected to the inner bottom portion 7g via the inner tube portion 7d is placed on the upper portion of the annular portion 7i connected to the outer tube portion 7e. Therefore, the upper annular portion 7h is always pressed against the lower annular portion 7i by the biasing force of the spring 9, and thus the magnetic portion including the outer tube portion 7e and the non-magnetic portion including the inner tube portion 7d are not separated, i.e., the magnetic portion and the non-magnetic portion are maintained in an integrated state as the first movable member 7A. That is, it can be said that the spring 9 biases the entire first movable member 7A downward (toward the second fixed iron core 6). In a case where a portion for storing the spring 9, the portion being located above the first movable member 7A (on the first fixed iron core 5 side), is defined as a spring chamber L6, the spring chamber L6 communicates with the outside via an orifice passage p5.

More specifically, in this embodiment, the orifice passage p5 is formed by an orifice hole penetrating the thickness of the inner bottom portion 7g of the first movable member 7A. In a case where the first movable member 7A vertically (axially) moves, a volume of the spring chamber L6 increases or decreases, and liquid corresponding to the increase or decrease in volume passes through the orifice passage p5. The orifice passage p5 applies resistance to a flow of the liquid, and thus damping force that prevents the movement of the first movable member 7A is generated. Action of the damping force restrains a rapid movement of the first movable member 7A. Therefore, the movement of the first movable member 7A becomes slow.

Meanwhile, a communication passage p6 that causes upper and lower sides (the first fixed iron core 5 side and the second fixed iron core 6 side) of the second movable member 8A to communicate with each other is formed in the second movable member 8A, and liquid can move through the communication passage p6 with relatively low resistance. An inner diameter of the intermediate tube portion 8e of the second movable member 8A is larger than an outer diameter of the inner tube portion 7d of the first movable member 7A, and an annular gap is formed therebetween. Therefore, a space formed above the intermediate tube portion 8e (on the first fixed iron core 5 side) and a space formed between the outer bottom portion 8d and the inner bottom portion 7g are continuous. The communication passage p6 communicates with the continuous space. Therefore, it is possible to restrain damping force that prevents movement of the second movable member 8A from being generated due to enclosure of the liquid in the space.

In this embodiment, the communication passage p6 is formed by a communication hole that is open to a bottom of a recessed portion 8f formed in the outer bottom portion 8d at a position facing an opening at the other end of the orifice passage p5 and communicates with a space below the outer bottom portion 8d. Therefore, as illustrated in FIG. 8, even in a state in which the inner bottom portion 7g of the first movable member 7A abuts on the outer bottom portion 8d of the second movable member 8A, the orifice passage p5 is not blocked. Therefore, the second movable member 8A does not obstruct a flow of the liquid passing through the orifice passage p5.

In this embodiment, the first movable member 7A vertically (axially) moves while the outer tube portion 7e is being supported by the filler ring 41. Therefore, the first movable member 7A does not become eccentric with respect to the filler ring 41 when the first movable member 7A moves. The filler ring 41 is sandwiched between the first fixed iron core 5 and the second fixed iron core 6 and is fixedly provided with respect to those fixed iron cores. Therefore, the filler ring 41 prevents the first movable member 7A from being displaced in a direction (radial direction) orthogonal to the center line of the coil.

The second movable member 8A vertically (axially) moves while the intermediate tube portion 8e is being supported by the outer tube portion 7e of the first movable member 7A. Thus, in the solenoid S2 according to this embodiment, the second movable member 8A is inserted into the first movable member 7A that is inserted into the filler ring 41. This makes it possible to prevent the first movable member 7A from being radially displaced when the first movable member 7A is adsorbed to the first fixed iron core 5 and also to prevent the second movable member 8A from being sandwiched between the radially displaced first movable member 7A and the filler ring 41. Therefore, there is no concern that the second movable member 8A is sandwiched between the radially displaced first movable member 7A and the filler ring 41 to increase sliding resistance when the second movable member 8A moves.

Furthermore, in this embodiment, as illustrated in FIG. 8(b), a protruding portion 7j is provided on an inner periphery of a distal end portion of the outer tube portion 7e of the first movable member 7A so as to protrude toward the center thereof, and a sheet 70 made from fluororesin is held by the protruding portion 7j on the inner periphery of the outer tube portion 7e. This improves slidability between the intermediate tube portion 8e of the second movable member 8A and the outer tube portion 7e of the first movable member 7A. The material of the sheet 70 is not limited to fluororesin and can be appropriately changed as long as the material has satisfactory slidability. Note that the sheet 70 may be omitted, and the intermediate tube portion 8e may be brought into direct sliding contact with the inner periphery of the outer tube portion 7e.

When the first movable member 7A moves downward with respect to the second movable member 8A, the inner bottom portion 7g of the first movable member 7A abuts on the outer bottom portion 8d of the second movable member 8A. Then, the first regulating portion 90 regulates the downward movement of the first movable member 7A with respect to the second movable member 8A, and thereafter, the first movable member 7A moves downward integrally with the second movable member 8A. That is, a portion including the annular portion 7h, the inner tube portion 7d, and the inner bottom portion 7g of the first movable member 7A, which is made from a non-magnetic material, functions as the first regulating portion 90 that regulates the downward movement (toward the second fixed iron core 6) of the first movable member 7A with respect to the second movable member 8A.

The solenoid S2 according to this embodiment also includes the second regulating portion 91 that regulates downward movement (toward the second fixed iron core 6) of the second movable member 8A. As in the first embodiment, the second regulating portion 91 is an annular member made from a non-magnetic material and is press-fitted into the inner periphery of the annular protruding portion 6a of the second fixed iron core 6 into which a lower end portion of the second movable member 8A is inserted. When the second movable member 8A moves downward, the outer bottom portion 8d of the second movable member 8A abuts on the second regulating portion 91, and the second movable member 8A does not move downward any more.

Furthermore, as in the first embodiment, a through hole is formed at the center of the second fixed iron core 6, and the shaft portion 3a of the spool 3 is movably inserted into the through hole. The distal end of the shaft portion 3a abuts on the outer bottom portion 8d of the second movable member 8A. Therefore, in a state in which the coil 4 is not energized, the first movable member 7A moves downward upon receipt of the biasing force of the spring 9, and the first regulating portion 90 abuts on the second movable member 8A. Thus, the spool 3 receives downward force caused by the biasing force of the spring 9. Meanwhile, when the coil 4 is energized to attract the first movable member 7A to the first fixed iron core 5 and attract the second movable member 8A to the second fixed iron core 6, the spring 9 is compressed by the first movable member 7A and the biasing force thereof is not transmitted to the spool 3, but the spool 3 receives downward force caused by force to attract the second movable member 8A.

As in the first embodiment, the first and second regulating portions 90 and 91 prevent the first movable member 7A and the second movable member 8A from being adsorbed to each other and the second movable member 8A from being adsorbed to the second fixed iron core 6 when the coil 4 is energized. Meanwhile, no regulating portion is provided between the first fixed iron core 5 and the first movable member 7A, and therefore the first movable member 7A is adsorbed to the first fixed iron core 5 when the coil 4 is energized. Thus, when the coil 4 is energized and the first movable member 7A is adsorbed to the first fixed iron core 5, the spring 9 is compressed by the first movable member 7A, and therefore it is possible to stably maintain a posture of the first movable member 7A that prevents the biasing force of the spring 9 from being transmitted to the second movable member 8A.

Furthermore, as described above, in this embodiment, the spring chamber L6 for storing the spring 9, which is formed on the first fixed iron core 5 side of the first movable member 7A, communicates with the outside through the orifice passage p5. When the first movable member 7A moves, damping force caused by resistance of the orifice passage p5 is generated. Therefore, even in a case where the first movable member 7A is adsorbed to the first fixed iron core 5 when the coil 4 is energized, it is possible to prevent a large adsorbing sound from being generated at the time of the adsorption. However, the first movable member 7A is not necessarily adsorbed to the first fixed iron core 5 when the coil 4 is energized, and, in such a case, the orifice passage p5 may be replaced with a communication passage.

A relationship between an amount of current supplied to the solenoid S2 according to this embodiment and force applied to the spool (object) 3 by the solenoid S2 is similar to the relationship in a case of the solenoid S1 according to the first embodiment, i.e., is as shown in FIG. 4. Operation of a shock absorber provided with a solenoid valve including the solenoid S2 according to this embodiment is also similar to the operation of the shock absorber D provided with the solenoid valve V including the solenoid S1 according to the first embodiment.

Hereinafter, effects of the solenoid S2 according to this embodiment will be described. As a matter of course, configurations of the solenoid S2 similar to those of the solenoid S1 according to the first embodiment have similar effects, and therefore detailed description thereof is omitted herein. Furthermore, effects of the solenoid valve including the solenoid S2 according to this embodiment and the shock absorber provided with the solenoid valve including the solenoid S2 are also similar to the effects of the solenoid S1 according to the first embodiment, the solenoid valve V including the solenoid S1, and the shock absorber D provided with the solenoid valve V including the solenoid S1, and therefore detailed description thereof is omitted herein.

The solenoid S2 according to this embodiment includes: the coil; the first fixed iron core 5 located on one axial end side of the coil; the second fixed iron core 6 located on the other axial end side of the coil with a gap from the first fixed iron core 5; the first movable member 7A disposed between the first fixed iron core 5 and the second fixed iron core 6 and configured to be attracted to the first fixed iron core 5 by energization of the coil; the second movable member 8A disposed between the first fixed iron core 5 and the second fixed iron core 6 and configured to be attracted to the second fixed iron core 6 by energization of the coil; the spring 9 configured to bias the first movable member 7A toward the second fixed iron core 6; and the first regulating portion 90 made from a non-magnetic material, provided integrally with the first movable member 7A, and configured to regulate movement of the first movable member 7A toward the second fixed iron core 6 with respect to the second movable member 8A.

According to the above configuration, when the solenoid S2 is not energized, the first movable member 7A receives the biasing force of the spring 9 and moves toward the second fixed iron core 6, and, when the first regulating portion 90 regulates the movement of the first movable member 7A toward the second fixed iron core 6 with respect to the second movable member 8A, the first movable member 7A and the second movable member 8A integrally move toward the second fixed iron core 6. Therefore, when the solenoid S2 is not energized, the biasing force of the spring 9 is transmitted from the first movable member 7A to the second movable member 8A.

Meanwhile, when the solenoid S2 is energized, the first movable member 7A is attracted to the first fixed iron core 5 and moves in the attraction direction, the spring 9 is compressed by the first movable member 7A, and therefore the biasing force of the spring 9 is not transmitted to the second movable member 8A. Furthermore, when the solenoid S2 is energized, the second movable member 8A is attracted to the second fixed iron core 6, and the force to attract the second movable member 8A to the second fixed iron core 6 increases as the amount of current supplied to the solenoid S2 is increased.

Therefore, when the solenoid S2 is energized and the force to attract the second movable member 8A is applied to an object such as the spool 3 as the thrust, the thrust applied to the object increases as the amount of current supplied to the solenoid S2 is increased, whereas the thrust applied to the object decreases as the amount of current supplied to the solenoid S2 is decreased. When the solenoid is not energized, the biasing force of the spring 9 acts on the object via the first movable member 7A and the second movable member 8A. The direction of the biasing force of the spring 9 is the same as the direction of the force to attract the second movable member 8A when the solenoid S2 is energized. Therefore, according to the above configuration, even when the solenoid S2 is not energized, the object can be biased in the same direction as that when the solenoid is energized.

According to the above configuration, as described above, when the solenoid S2 is energized and the first movable member 7A moves toward the first fixed iron core 5 against the biasing force of the spring 9, the biasing force of the spring 9 is not transmitted to the second movable member 8A, and is thus not transmitted to the spool (object) 3. Therefore, it is possible to individually and freely set the thrust of the solenoid S2 when the solenoid S2 is energized and the biasing force applied to the object by the spring 9 when the solenoid S2 is not energized. The spring 9 is a coil spring in this embodiment, but may be a spring other than the coil spring, such as a disc spring.

In the solenoid S2 according to this embodiment, the first regulating portion 90 that regulates the movement of the first movable member 7A toward the second fixed iron core 6 with respect to the second movable member 8A is made from a non-magnetic material. This makes it possible to prevent the first movable member 7A and the second movable member 8A from being adsorbed to each other when the coil is energized. Furthermore, in the solenoid S2 according to this embodiment, the first regulating portion 90 is provided integrally with the first movable member 7A. Therefore, for example, when a PWM control current is applied to the solenoid S2, the first movable member 7A and the second movable member 8A vibrate to excite and vibrate the first regulating portion 90, thereby preventing an increase in high frequency sound.

The solenoid S2 according to this embodiment further includes the second regulating portion 91 provided integrally with the second fixed iron core 6 and configured to regulate movement of the second movable member 8A toward the second fixed iron core 6. According to the configuration, it is possible to prevent the second movable member 8A from being adsorbed to the second fixed iron core 6 when the coil is energized. Furthermore, for example, when the PWM control current is applied to the solenoid S2, the second movable member 8A vibrates to excite and vibrate the second regulating portion 91, thereby preventing an increase in high frequency sound.

The solenoid S2 according to this embodiment includes the annular filler ring 41 interposed between the first fixed iron core 5 and the second fixed iron core 6. The first movable member 7A has the inner tube portion 7d and the outer tube portion 7e disposed on inner and outer sides in a double manner, the connecting portion 7f connecting one axial ends of the inner tube portion 7d and the outer tube portion 7e, and the inner bottom portion 7g located at the other end of the inner tube portion 7d. The first movable member 7A is slidably inserted into the filler ring 41 while the inner bottom portion 7g is facing the second fixed iron core 6. Meanwhile, the second movable member 8A has a bottomed tubular shape and has the outer bottom portion 8d and the intermediate tube portion 8e standing on the outer peripheral edge of the outer bottom portion 8d and having the inner diameter larger than the outer diameter of the inner tube portion 7d of the first movable member 7A. The intermediate tube portion 8e is slidably inserted into the outer tube portion 7e of the first movable member 7A while the outer bottom portion 8d is facing the second fixed iron core 6. The spring 9 is interposed between the inner bottom portion 7g and the first fixed iron core 5 so that one end side of the spring 9 is inserted into the inner tube portion 7d of the first movable member 7A.

According to the above configuration, in a case where the outer tube portion 7e of the first movable member 7A and the intermediate tube portion 8e of the second movable member 8A are made from a magnetic material, a magnetic path passes through the first fixed iron core 5, the first movable member 7A, the second movable member 8A, and the second fixed iron core 6 when the coil is excited, thereby attracting the first movable member 7A to the first fixed iron core 5 and attracting the second movable member 8A to the second fixed iron core 6. Furthermore, a space for storing the spring 9 can be secured inside the inner tube portion 7d of the first movable member 7A.

According to the above configuration, when the first movable member 7A moves toward the second fixed iron core 6, the inner bottom portion 7g of the first movable member 7A approaches the outer bottom portion 8d of the second movable member 8A. Therefore, in a case where the first regulating portion 90 is disposed to regulate the movement thereof in the approaching direction, it is possible to regulate the movement of the first movable member 7A toward the second fixed iron core 6 with respect to the second movable member 8A. In order to dispose the first regulating portion 90 as described above, for example, the inner bottom portion 7g of the first movable member 7A is only required to function as the first regulating portion 90 to abut on the outer bottom portion 8d of the second movable member 8A as in this embodiment, which is easy. That is, according to the above configuration, the first regulating portion 90 can be easily disposed.

Similarly, according to the above configuration, when the second movable member 8A moves toward the second fixed iron core 6, the outer bottom portion 8d of the second movable member 8A approaches the second fixed iron core 6. Therefore, in a case where the second regulating portion 91 is disposed to regulate the movement thereof in the approaching direction, it is possible to regulate the movement of the second movable member 8A toward the second fixed iron core 6. In order to dispose the second regulating portion 91 as described above, for example, it is only required to dispose the second regulating portion 91 between the outer bottom portion 8a and the second fixed iron core 6 as in this embodiment, which is easy. That is, according to the above configuration, the second regulating portion 91 can be easily disposed.

In the solenoid S2, the intermediate tube portion 8e of the second movable member 8A is slidably inserted into the outer tube portion 7e of the first movable member 7A that is slidably inserted into the filler ring 41. Thus, because the second movable member 8A is inserted into the first movable member 7A that is inserted into the filler ring 41, there is no concern that the first movable member 7A radially moves when the first movable member 7A is adsorbed to the first fixed iron core 5 and the second movable member 8A is sandwiched between the first movable member 7A and the filler ring 41. This makes it possible to secure smooth vertical movement of the second movable member 8A. As a result, as described above, in a case where the force to attract the second movable member 8A is applied to the object as the thrust, it is possible to restrain occurrence of a hysteresis in the characteristic of the thrust with respect to the amount of current supplied to the solenoid S2. Thus, the thrust can be easily controlled.

In this embodiment, a portion from the inner bottom portion 7g to the inner tube portion 7d of the first movable member 7A is made from a non-magnetic material and functions as the first regulating portion 90. This makes it possible to reduce the solenoid S2 in weight.

However, in the solenoid S2 according to this embodiment, as well as in the solenoid S1 according to the first embodiment, the first and second regulating portions 90 and 91 can be appropriately changed. For example, only the inner bottom portion 7g of the first movable member 7A may be made from a non-magnetic material and may function as the first regulating portion 90. Even in a case where the first regulating portion 90 is an annular member made from a non-magnetic material and is press-fitted into an inner periphery of the intermediate tube portion 8e of the second movable member 8A, the regulating members 93 and 94 illustrated in FIGS. 6 and 7 may be attached to the outer bottom portion 8d of the second movable member 8A.

Hereinabove, the preferred embodiments of the present invention have been described in detail, but modifications, variations, and alterations can be made without departing from the scope of the claims.

REFERENCE SIGNS LIST

D shock absorber
M main passage
L6 spring chamber
O orifice
p1 pressure introduction passage
p2 pressure control passage
p5 orifice passage
S1, S2 solenoid
V solenoid valve
1 cylinder
2 main valve body
3 spool (valve body)
4 coil
first fixed iron core
6 second fixed iron core
6a annular protruding portion
7, 7A first movable member
7a, 7g inner bottom portion
7b, 7d inner tube portion
7e outer tube portion
7f connecting portion
8, 8A second movable member
8a, 8d outer bottom portion
8b outer tube portion
8c through hole
8e intermediate tube portion
9 spring
11 piston rod (rod)
41 filler ring
90 first regulating portion
91 second regulating portion
91a seat portion
91b fitting portion
93, 94 regulating member
93a, 94a insertion shaft
93b, 94b seat portion

The invention claimed is:
1. A solenoid comprising:
a coil;
a first fixed iron core located on one axial end side of the coil;
a second fixed iron core located on an other axial end side of the coil and provided apart from the first fixed iron core;

a first movable member disposed between the first fixed iron core and the second fixed iron core and configured to be attracted to the first fixed iron core by energization of the coil;

a second movable member disposed between the first fixed iron core and the second fixed iron core and configured to be attracted to the second fixed iron core by energization of the coil;

a spring configured to bias the first movable member toward the second fixed iron core;

a first regulating portion made from a non-magnetic material, provided integrally with the first movable member or the second movable member, and configured to regulate movement of the first movable member toward the second fixed iron core with respect to the second movable member;

a second regulating portion made from a non-magnetic material, provide integrally with the second movable member or the second fixed iron core, and configured to regulate movement of the second movable member toward the second fixed iron core; and an annular filler ring interposed between the first fixed iron core and the second fixed iron core, wherein the second movable member has a bottomed tubular shape, has an outer bottom portion and an outer tube portion standing on an outer peripheral edge of the outer bottom portion, and is inserted into the filler ring so as to be axially movable while the outer bottom portion is facing the second fixed iron core, the first movable member has a bottomed tubular shape and has an inner bottom portion and an inner tube portion standing on an outer peripheral edge of the inner bottom portion, the inner tube portion being inserted into the outer tube portion so as to be axially movable while the inner bottom portion is facing the second fixed iron core, and the spring is interposed between the inner bottom portion and the first fixed iron core so that one end side of the spring is inserted into the inner tube portion.

2. The solenoid according to claim 1, further comprising a regulating member attached to the outer bottom portion, wherein the regulating member has an insertion shaft and a seat portion, the insertion shaft being press-fitted into a through hole formed in the outer bottom portion while one end of the insertion shaft is protruding from the outer bottom portion toward the second fixed iron core, the seat portion being located between the outer bottom portion and the inner bottom portion so as to protrude from an other end of the insertion shaft toward an outer peripheral side, the seat portion functions as the first regulating portion, and one end portion of the insertion shaft protruding from the outer bottom portion toward the second fixed iron core functions as the second regulating portion.

3. The solenoid according to claim 1, further comprising a regulating member attached to the outer bottom portion, wherein the regulating member has an insertion shaft and a seat portion, the insertion shaft being press-fitted into a through hole formed in the outer bottom portion while one end of the insertion shaft is protruding from the outer bottom portion toward the first fixed iron core, the seat portion being located between the outer bottom portion and the second fixed iron core so as to protrude from an other end of the insertion shaft toward an outer peripheral side, one end portion of the insertion shaft protruding from the outer bottom portion toward the first fixed iron core functions as the first regulating portion, and the seat portion functions as the second regulating portion.

4. The solenoid according to claim 1, wherein the second regulating portion has a seat portion and a fitting portion, the seat portion being located between the outer bottom portion and the second fixed iron core, the fitting portion being press-fitted into a through hole formed in the outer bottom portion so as to protrude from the seat portion.

5. A solenoid valve including the solenoid according to claim 1 and provided partway in a pressure control passage, the solenoid valve comprising:

a valve body configured to open and close the pressure control passage, wherein the solenoid applies force to attract the second movable member toward the second fixed iron core, the force being generated when the coil is energized, to the valve body in a direction to close the pressure control passage.

6. A solenoid comprising:

a coil;

a first fixed iron core located on one axial end side of the coil;

a second fixed iron core located on an other axial end side of the coil and provided apart from the first fixed iron core;

a first movable member disposed between the first fixed iron core and the second fixed iron core and configured to be attracted to the first fixed iron core by energization of the coil;

a second movable member disposed between the first fixed iron core and the second fixed iron core and configured to be attracted to the second fixed iron core by energization of the coil;

a spring configured to bias the first movable member toward the second fixed iron core;

a first regulating portion made from a non-magnetic material, provided integrally with the first movable member or the second movable member, and configured to regulate movement of the first movable member toward the second fixed iron core with respect to the second movable member;

a second regulating portion made from a non-magnetic material, provide integrally with the second movable member or the second fixed iron core, and configured to regulate movement of the second movable member toward the second fixed iron core; and an annular filler ring interposed between the first fixed iron core and the second fixed iron core, wherein the first movable member has an inner tube portion and outer tube portion disposed on inner and outer sides in a double manner, a connecting portion connecting one axial end of the inner tube portion and one axial end of the outer tube portion, and an inner bottom portion located at an other end of the inner tube portion and is slidably inserted into the filler ring while the inner bottom portion is facing the second fixed iron core, the second movable member has a bottomed tubular shape and has an outer bottom portion and an intermediate tube portion standing on an outer peripheral edge of the outer bottom portion and having an inner diameter larger than an outer diameter of the inner tube portion, the intermediate tube portion being slidably inserted into the outer tube portion while the outer bottom portion is facing the second fixed iron core, and the spring is interposed between the inner bottom portion and the first fixed iron core so that one end side of the spring is inserted into the inner tube portion.

7. The solenoid according to claim 6, wherein the second fixed iron core has an annular protruding portion into which a second-fixed-iron-core-side end portion of the second movable member is inserted, and the second regulating portion is an annular member and is press-fitted into an inner periphery of the annular protruding portion.

8. A solenoid valve including the solenoid according to claim 6 and provided partway in a pressure control passage, the solenoid valve comprising:

a valve body configured to open and close the pressure control passage, wherein the solenoid applies force to attract the second movable member toward the second fixed iron core, the force being generated when the coil is energized, to the valve body in a direction to close the pressure control passage.

9. A solenoid comprising:

a coil;

a first fixed iron core located on one axial end side of the coil;

a second fixed iron core located on an other axial end side of the coil and provided apart from the first fixed iron core;

a first movable member disposed between the first fixed iron core and the second fixed iron core and configured to be attracted to the first fixed iron core by energization of the coil;

a second movable member disposed between the first fixed iron core and the second fixed iron core and configured to be attracted to the second fixed iron core by energization of the coil;

a spring configured to bias the first movable member toward the second fixed iron core;

a first regulating portion made from a non-magnetic material, provided integrally with the first movable member or the second movable member, and configured to regulate movement of the first movable member toward the second fixed iron core with respect to the second movable member; and an annular filler ring interposed between the first fixed iron core and the second fixed iron core, wherein the first movable member has an inner tube portion and outer tube portion disposed on inner and outer sides in a double manner, a connecting portion connecting one axial end of the inner tube portion and one axial end of the outer tube portion, and an inner bottom portion located at an other end of the inner tube portion and is slidably inserted into the filler ring while the inner bottom portion is facing the second fixed iron core, the second movable member has a bottomed tubular shape and has an outer bottom portion and an intermediate tube portion standing on an outer peripheral edge of the outer bottom portion and having an inner diameter larger than an outer diameter of the inner tube portion, the intermediate tube portion being slidably inserted into the outer tube portion while the outer bottom portion is facing the second fixed iron core, and the spring is interposed between the inner bottom portion and the first fixed iron core so that one end side of the spring is inserted into the inner tube portion.

10. A solenoid valve including the solenoid according to claim 9 and provided partway in a pressure control passage, the solenoid valve comprising:

a valve body configured to open and close the pressure control passage, wherein the solenoid applies force to attract the second movable member toward the second fixed iron core, the force being generated when the coil is energized, to the valve body in a direction to close the pressure control passage.

11. A shock absorber including the solenoid valve according to claim 10, the shock absorber comprising:

a cylinder;

a rod inserted into the cylinder so as to be axially movable;

a main passage through which liquid flows when the cylinder and the rod axially and relatively move;

a main valve body configured to open and close the main passage; and a pressure introduction passage provided with an orifice partway in the pressure introduction passage and configured to reduce a pressure on an upstream side from the main valve body of the main passage and guide the pressure to a back surface of the main valve body, wherein the pressure control passage is connected to the pressure introduction passage on a downstream side from the orifice.

12. The solenoid according to claim 9, wherein a portion from the inner bottom portion to the inner tube portion is made from a non-magnetic material and functions as the first regulating portion.

* * * * *